(12) United States Patent
Ganca

(10) Patent No.: US 7,353,233 B1
(45) Date of Patent: Apr. 1, 2008

(54) APPARATUS AND METHOD FOR REAL-TIME DECOMPRESSION OF DATA STREAMS ON LIMITED-RESOURCE EMBEDDED DEVICES

(75) Inventor: Alexandre Ganca, Montreal (CA)

(73) Assignee: Majesco Entertainment Company, Edison, NJ (US)

( * ) Notice: Subject to any disclaimer, the term of this patent is extended or adjusted under 35 U.S.C. 154(b) by 387 days.

(21) Appl. No.: 11/103,668

(22) Filed: Apr. 12, 2005

Related U.S. Application Data

(60) Provisional application No. 60/562,765, filed on Apr. 16, 2004.

(51) Int. Cl.
*G06F 7/00* (2006.01)
(52) U.S. Cl. .................................... 707/101
(58) Field of Classification Search ............ 707/101, 707/102, 204; 345/578, 591, 600
See application file for complete search history.

(56) References Cited

U.S. PATENT DOCUMENTS

| 5,227,863 A | 7/1993 | Bibrey et al. ............... 348/578 |
| 5,432,893 A | 7/1995 | Blasubramanian et al. . 345/600 |
| 6,326,977 B1 | 12/2001 | Westerman ................. 345/591 |

OTHER PUBLICATIONS

D. Huffman, "A Method for the Construction of Minimum-Redundancy Codes," Proceedings of the IRE 40, pp. 1098-1101, 1952.
P. Deutsch, "DEFLATE Compressed Data Format Specification version 1.3," Network Working Group, Request for Comments: 1951, Aladdin Enterprises, May 1996.

*Primary Examiner*—Chong H Kim
(74) *Attorney, Agent, or Firm*—Dov Rosenfeld; Inventek

(57) ABSTRACT

An improved Huffman code deflating method including look-up tables that provide improved performance on limited resource devices, such as hand held gaming devices. The tables are generated from Huffman binary tree data into a primary table and/or one or more secondary tables. For codes having secondary tables, the primary table contains an offset to the secondary table, which contains the information of the secondary table with a minimum number of bits of storage.

34 Claims, 16 Drawing Sheets

| Table Entry I (801) | Value (803) | Code Length or Secondary Table Size (805) |
|---|---|---|
| 0000 | 12 | 2 |
| 0001 | 12 | 2 |
| 0010 | 12 | 2 |
| 0011 | 12 | 2 |
| 0100 | 11 | 3 |
| 0101 | 11 | 3 |
| 0110 | 13 | 3 |
| 0111 | 13 | 3 |
| 1000 | 16 | 3 |
| 1001 | 16 | 3 |
| 1010 | 7 | 4 |
| 1011 | 8 | 4 |
| 1100 | 9 | 4 |
| 1101 | First Secondary Table Offset | 1 |
| 1110 | Second Secondary Table Offset | 1 |
| 1111 | Third Secondary Table Offset | 3 |

Primary Table

| Next bit 811 → | Value 813 → | Code Length 815 → |
|---|---|---|
| 0 | 4 | 5 |
| 1 | 6 | 5 |

First Secondary Table

| Next bit 821 → | Value 823 → | Code Length 825 → |
|---|---|---|
| 0 | 10 | 5 |
| 1 | 14 | 5 |

Second Secondary Table

| Next 3 bits 831 → | Value 833 → | Code Length 835 → |
|---|---|---|
| 000 | 3 | 6 |
| 001 | 3 | 6 |
| 010 | 5 | 6 |
| 011 | 5 | 6 |
| 100 | 15 | 6 |
| 101 | 15 | 6 |
| 110 | 0 | 7 |
| 111 | 17 | 7 |

Third Secondary Table

FIG. 8D

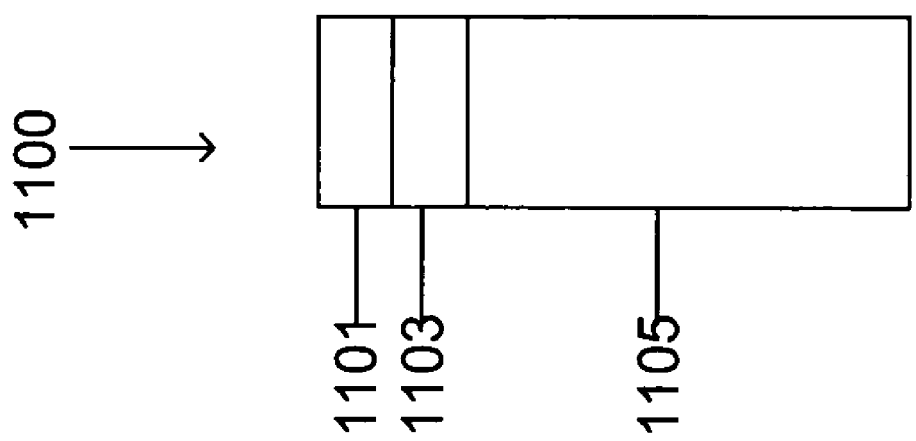

APPARATUS AND METHOD FOR REAL-TIME DECOMPRESSION OF DATA STREAMS ON LIMITED-RESOURCE EMBEDDED DEVICES

CROSS-REFERENCE TO RELATED APPLICATIONS

This application claims the benefit of U.S. Provisional Application No. 60/562,765, filed Apr. 16, 2004, the contents of which are incorporated herein by reference.

BACKGROUND OF THE INVENTION

The present invention generally relates to apparatus and methods for coding and decoding digital data, and more particularly to an apparatus and method for efficiently decompressing entropy coded data.

Over the years, portable (or hand-held) game machines have been, and continue to be, very popular. Typically, these portable game machines include a hand-held game machine housing a display for displaying images and a game processing unit, and associated hardware for running a game program. The game program itself is typically contained in a game program memory such as, for example, a semiconductor memory (e.g., ROM, EPROM, etc.) that is part of a removable cartridge. By storing the game program in a removable cartridge, the user can conveniently and easily change the game being played by simply exchanging one cartridge with another, different cartridge containing a different game. Examples of portable game machines are the "Game Boy®" and "Game Boy® Color" products manufactured and sold by Nintendo of America Inc.

Generally, the functionality of conventional portable game machines of the type described above is directed to executing, on the hand-held processing unit, the game that is provided to the game program memory from a particular removable cartridge in response to user input. When using the portable game machine, visual and auditory feedback is provided to the user. The visual and auditory content is stored in compressed form in the removable cartridge along with programming information to instruct the processor for decompressing the content. The visual content is provided to the user on a color or monochrome display, such as a liquid crystal display (LCD), and the auditory content is provided from a speaker that is part of the hand-held unit or to a headphone jack.

A prior art embedded device is illustrated in FIGS. 1A, 1B, and 1C, which show a portable (hand-held) color display game machine (hereinafter, referred to simply as "game machine") 10 that displays game characters in color on a color liquid crystal display (LCD) 16 when a prior art color-ready game cartridge 12 is selectively inserted into a slot 18', and in FIG. 2 as an overall block diagram of the game machine and game cartridge. Batteries (not shown) (e.g., 2 AA batteries) provide power for game machine 10, which may also be configured for connection to an AC adapter to permit extended use without batteries. Game machine 10 is a prior art game machine and is described, for example, in U.S. Pat. No. 6,716,103, incorporated herein by reference.

The color LCD 16 displays either color or black and white depending on the type of game cartridge 12 inserted into the game machine 10. With reference to FIG. 2, prior art game machine 10 includes color LCD 16 as described above, and is formed as a dot matrix display and is driven by LCD drivers 22 and 24 to display color images on its screen. LCD driver 22 selectively drives, for example, the rows of the dot matrix display and LCD driver 24 selectively drives, for example, the columns of the dot matrix display. LCD drivers 22, 24 are supplied with color image signals from a color display processing circuit 28 included in a central processing unit (CPU) 25.

CPU 25 further includes a CPU core 30 that is connected to an internal read only memory (ROM) 32 and an internal random access memory (RAM) 34. Internal RAM 34 is used as a work memory of CPU core 30. CPU 25 further includes a basic oscillator 36, for example, a quartz oscillator that supplies an oscillating signal to a programmable frequency divider 38. Programmable frequency divider 38 divides the oscillating signal from basic oscillator 36 in accordance with frequency division data from CPU core 30, and supplies a divided signal as a clock of CPU core 30.

Programs for operating game machine 10 are provided through a connector 40 connected to CPU 25 by an appropriate bus. More specifically, game cartridge 12 shown in FIG. 1A is selectively attachable to connector 40. Game cartridge 12 is preferably in the form of a replaceable memory cartridge that can be inserted into slot 18 of game machine 10 and having a printed circuit board with a connector defining a number of electrical contacts. When game cartridge 12 is inserted into slot 18 of game machine 10, the cartridge electrical contacts mate with corresponding "edge connector" electrical contacts within game machine 10. This action electrically connects the printed circuit board to the electronics within game machine 10. In this example, the printed circuit board of game cartridge 12 at least includes a read-only memory (ROM) 42 and a read/write memory (e.g., SRAM) 46. ROM 42 stores instructions and other information pertaining to a particular video game. ROM 42 for one game cartridge 12 may, for example, contain instructions and other information for an adventure game while the ROM of another game cartridge 12 may contain instructions and other information for a car race game or an educational game, for example. To play a game, a user of game machine 10 need only plug the appropriate game cartridge into slot 18 of game machine 10 thereby connecting the cartridge's ROM 42 (and any other circuitry it may contain) to game machine 10. This enables the game machine circuitry to access information contained within ROM 42 (and read/write memory 46), which information controls the game machine to play the appropriate video game by displaying images and reproducing sound as specified under control of the ROM game program information. Read/write memory 46 is used to store data such as game backup data.

In accordance with the game program, character data supplied from game cartridge 12 and the controller data from operating keys 48a-48e, CPU 25 executes data processing and writes display data into a display RAM 52, using an extended RAM 50 when necessary. As a result of the data processing by CPU 25, pixels of color LCD 16 are controlled and sound signals are provided, through volume controls 54 and 56, to a speaker 58 and/or to an earphone jack 60. Color LCD 16 displays still or moving images, and sound signals output from speaker 58 and/or earphone jack 60 include game sound effects, voices and music.

Generally speaking, to use game machine 10 to play a game, a user selects a game cartridge 12 containing a desired video game, and inserts that game cartridge into slot 18 of game machine 10, thereby electrically connecting ROM 42 and other cartridge electronics to game machine 10. The user then operates a power switch 21 (see FIG. 1B) to turn on game machine 10 and operates operating keys 48a-48e to control video game play.

The gaming experience depends on the quality of the content provided to the user, where the quality includes the resolution of the display (both in pixel and color resolution), the tonal quality of the sound output, and how rapidly the output can change in response to the user's input. The memory and computational limitations of embedded devices, such as game machine 10, require that audio and video be stored in the removable memory unit, such as game cartridge 12, in compressed format which must be decompressed prior to being displayed.

The ability of embedded devices to play back compressed audio and video is limited by the memory and processing power of game machine 10, the memory of game cartridge 12, and the speed at which the game machine can read information from the game cartridge. Data compression has become an important and integral part of many computer systems and networks. In particular, compression is used for, but not limited to, the storage or transmission of digital representations of text, sound, still images, audio, and video. Data compression algorithms permit an increased amount of information that can be stored on a storage medium, enabling multimedia teleconferencing, and allowing the real-time display of video over the Internet.

The device or algorithm that compresses and/or decompresses the data is termed a "codec". Typically the codec is embodied as instructions to a programmable computer. The compression or decompression of a codec can include any one of a number of algorithms including, but not limited to, data manipulations, transformations, predictions, string recognition and replacement, and look-up tables or trees.

Thus, for example, lossless compression of the digital data, which provides for perfect reproduction of compressed data, can be improved by applying two or more consecutive compression algorithms to the data, for example by applying an algorithm that searches for and replaces repeating data sequences in a more compact manner, followed by an entropy coding algorithm that categorizes data according to their frequency and replaces more frequently occurring strings with smaller strings. Once so compressed, the data may be reconstructed by reversing the order of the compression steps. An example of such a technique is found in the DEFLATE compression algorithm. (RFC 1951, DEFLATE Compressed Data Format Specification version 1.3, http://www.ietf.org/rfc/rfc1951.txt). DEFLATE uses Lempel-Ziv 1977 (LZ77) compression to reduce the number of bits required to store repeating strings, and then further compresses the data using, as an entropy coding algorithm, either fixed or dynamic Huffman coding.

Huffman coding, as used in DEFLATE, substitutes fixed size segments of data with a code of variable length (for example by replacing each byte of original data with a code having a size of from 1 to a maximum allowable size, such as 15 bits). The Huffman code (that is, data values and their corresponding binary codes) is either predetermined prior to compression (fixed Huffman coding) or is determined at the time of compression to optimize the code for a particular data set or stream (dynamic Huffman coding). In general, Huffman coded data is stored as a header containing information used to reconstruct the code, followed by the coded data. Upon receipt of Huffman coded data, the prior art provides for using information in the header to generate a binary tree for looking-up codes, followed by the use of the binary tree for decoding.

FIG. 4 is a table 400 that contains a particular Huffman code that is generated for use in a particular set or stream of data (not shown), where a first column 401 contains data to be coded ("Value"), a second column 403 is the Huffman code, or codeword, for each Value ("Code"), and a third column 405 is the length in bits of each Code ("$L_{CodeLength}$"). Table 400 contains substitutions for 16 Values between 0 and 17 (from column 401), each of which has a Code (from column 403) having a length of from 2 to 7 bits (column 405). As is known in the art, a Huffman code is a binary code where the code length increases with decreasing code occurrence. Thus, for example, table 400 has been generated from a frequency distribution of values (not shown), with the most commonly occurring values having the shortest codes. Thus, for example, the most commonly occurring value is 12, which has a 2-bit long code of 00, and the least commonly occurring value is either 0 or 17, which each have a 7-bit code of 1111110 and 1111111, respectively.

Importantly, the Huffman code is a prefix code, and thus the value corresponding to the code is determined after the number of bits of the code is read. Thus, for example, the code 100, which is a 3-bit code corresponding to a value of 16, is not repeated as the first 3 bits of any code of equal or longer length in table 400. In addition, neither the first bit (1) nor the first two bits (10) are the first bits of any shorter code. With a prefix code, strings can be processed bit-by-bit until a code value is obtained, the order of the bits uniquely determines the code, irregardless of the code length.

In DEFLATE, Huffman codes are decoded using a binary tree parser. The tree is generated from the statistical table used for coding values, and the encoded symbol is reconstructed by parsing the code through the tree.

An example of a prior art Huffman decoding algorithms as implemented in DEFLATE can be understood with reference to FIG. 5, which contains a prior art binary tree 500 for decoding values coded using the code of table 400. Nodes of the tree 500 are points designated by either a circle or a square. A line segment connecting the nodes is called a "branch." The node located in the highest position is called a "root" 501. Further, an under node 502 connected via a branch 503 to a certain node 504 is termed a "child" of the node 504. Conversely, the upper layer node 504 is referred to as a "parent" of the child node 502. A node having no child is called a "leaf," and a unique symbol corresponds to each leaf. Further, the nodes excluding the leaves are referred to as "internal nodes," and the number of branches from the root down to each node constitutes levels or layers. In the figure, all internal nodes are shown as circles and leaf nodes are displayed as squares.

When encoding by use of the code tree 500, a path extending from the root 501 down to a target leaf is outputted as a code. More specifically, the algorithm proceeds by reading one bit at a time and branching to the left if the bit is a 0 and to the right if the bit is a 1. For instance, in the code tree illustrated in FIG. 5, the code 11010 leads to a symbol value "4" that corresponds to a leaf node 505 by following a path from root 501 that branches right (represented by the first code bit, 1), right (represented by the second code bit, 1), left (represented by the third code bit, 0), right (represented by the fourth code bit, 1), and lastly left (represented by the fifth code bit, 0). For exemplary purposes, each layer corresponds to N cycles of the computer processor unit (CPU). The number of processing cycles required to look up a value in tree 500 can be from 1N to 7N depending on the code length, with 5N processing cycles required to obtain the value for code 11010.

According to the principles of Huffman coding, the selection of short codes for frequently occurring values (with a minimum size of 1-bit) and long codes for infrequently occurring values reduces the number of bits, for example, required to store information. While Huffman codewords can greatly reduce the memory allocation, the processing times required to achieve the enumerated process limits its utility. These limitations are especially applicable to systems possessing small processing reservoirs. Thus, for example, embedded devices require the periodic decompression of small amounts of data. If the requested amount of data requires decompressing from more than one deflate block, then the Huffman tree would need to be extracted in-between blocks, before any decompression of the actual data can begin. This will clearly add an important (unwanted) processor time overhead. If the time allocated by the application to the decompression task is too high, unexpected slowdowns might occur.

While the prior art use of codecs, such as those using Huffman codes, is effective, the required memory and processor speed is not within the capabilities of most resource-limited devices, such as cell phones, personal digital assistants, and hand held games. Thus there is a need in the art for a method and apparatus that results in compression at least as good as prior art codecs, but which can be rapidly executed on devices having limited resources. Such a method and apparatus should be easily implemented in embedded devices.

BRIEF SUMMARY OF THE INVENTION

The present invention overcomes the disadvantages of the prior art by use of a more efficient method of decoding data through the use of one or more look-up tables. In one embodiment of the present invention, the code being decoded is a prefix code where the lengths of each of the codes can vary and are preferably selected to minimize the memory required for a coded stream of values. This is sometimes termed "entropy coding," and one example of such a code is a Huffman code.

It is one aspect of the present invention to provide a carrier medium carrying one or more computer readable code segments to instruct a processor to implement a method of generating one or more look-up tables to decompress binary strings of prefix codes into values. In one embodiment of the present invention, the method includes determining a plurality of binary codes, Ci, the length of each of said plurality of codes, Li, in bits, and a code value, Vi, corresponding to each of the plurality of codes, and setting a primary table of size T1 bits having $2^{T1}$ binary entries. For each code having length less than or equal to T1 bits, the method includes constructing primary table entries to look up each code in the T1 most significant entry bits, and return the corresponding code value. If any code has a length greater than T1 bits, then the code prefix of the code is defined as the T1 most significant bits, and the method further includes constructing primary table entries to look up the code prefix and return an offset to one of one or more secondary tables in the computer readable code corresponding to the code prefix, and constructing one or more secondary tables, each having a corresponding size, in bits and each having 2 to the power of the size binary entries, to look up the portion of each code of length greater than T1 bits not including the code prefix and return the corresponding code value. In general, the secondary table sizes are selected based on the secondary table entries and thus may differ from each other.

It is another aspect of the present invention to provide a carrier medium carrying one or more computer readable code segments to instruct a processor to implement a method of decompressing binary strings of prefix codes into values using one or more look-up tables. In one embodiment of the present invention, the method includes reading a binary code into an accumulator and looking up the T1 most significant bits of the accumulator in a primary table to return a first value and a second value. The next step is determining if a secondary table look-up is required. If a secondary table look-up is not required, then the method includes returning the code value as the returned first value, and noting that the code length is the returned second value. If a secondary table look-up is required, then the method includes determining a secondary table position in the computer readable code segment from the returned first value, and looking up the number of bits corresponding to the returned second value from the accumulator in the secondary table to return a code value and a code size. The method also includes shifting the most significant bits of the code length from the accumulator.

It is yet another aspect of the present invention to provide a method to instruct a processor to implement a method of generating one or more look-up tables to decompress binary strings of prefix codes into values. In one embodiment of the present invention, the method includes determining a plurality of binary codes, Ci, the length of each of said plurality of codes, Li, in bits, and a code value, Vi, corresponding to each of the plurality of codes, and setting a primary table of size T1 bits having $2^{T1}$ binary entries. For each code having length less than or equal to T1 bits, the method includes constructing primary table entries to look up each code in the T1 most significant entry bits, and return the corresponding code value. If any code has a length greater than T1 bits, then the code prefix of the code is defined as the T1 most significant bits, and the method further includes constructing primary table entries to look up the code prefix and return an offset to one of one or more secondary tables in the computer readable code corresponding to the code prefix, and constructing one or more secondary tables, each having a corresponding size, in bits, and having each having 2 to the power of the size binary entries, to look up the portion of each code of length greater than T1 bits not including the code prefix and return the corresponding code value.

It is one aspect of the present invention to provide a method to instruct a processor to implement a method of decompressing binary strings of prefix codes into values using one or more look-up tables. In one embodiment of the present invention, the method includes reading a binary code into an accumulator and looking up the T1 most significant bits of the accumulator in a primary table to return a first value and a second value. The next step is determining if a secondary table look-up is required. If a secondary table look-up is not required, then the method includes returning the code value as the returned first value, and noting that the code length is the returned second value. If a secondary table look-up is required, then the method includes determining a secondary table position in the computer readable code segment from the returned first value, and looking up the number of bits corresponding to the returned second value from the accumulator in the secondary table to return a code value and a code size. The method also includes shifting the most significant bits of the code length from the accumulator.

It is one aspect of the present invention to decode prior art Huffman coded data by using one or more look-up tables. The tables of the present invention are compatible with prior art Huffman coding techniques, permitting more efficient decoding of data that has been coded using prior art methods. In one embodiment, the tables of the present invention decode using less system resources, for example by using a smaller footprint than prior art decoding schemes and requiring almost the same amount of time to decode data.

It is another aspect of the present invention to provide look-up tables for decoding data that allow for partial decompression without reconstructing the tables.

It is yet another aspect of the present invention to provide a carrier medium having a computer program for decompressing data, including, but not limited to multimedia data such as audio or video, for playback on electronic devices. In one embodiment of the present invention, the program runs, in real-time, on electronic devices having limited resources, such as a limited amount of memory, computing limited to slow processing speeds or lacking in high-precision arithmetic functions, such as floating point processing, or slow transfer times for providing compressed data to the processor. One or more of these limitations are present in embedded devices, including but not limited to cell phones, personal digital assistants, and portable game machines. The present invention is well-suited for replaying time sequences of data, such as video or audio, on embedded devices, such as game machines.

It is one aspect of the present invention to provide a computer program that generates look-up tables for an entropy coded data stream and looks up values using the tables.

It is another aspect of the present invention to provide a carrier medium having a computer program that generates look-up tables for an entropy coded data stream and looks up values using the tables.

In one embodiment of the present invention, the tables for decoding entropy coded data include at least one primary table containing code values and lengths and, depending on the code characteristics and primary table size, the primary table also includes offset or pointers to one or more secondary tables that each contain code values and lengths. The primary table has $2^i$ indices, where "i" is an integer, and each secondary table, if needed, has $2^j$ indices, where j can be a different value for each secondary table. Specifically, the size of each secondary table is just large enough, to a power of 2, to contain all codes and values pointed to by the primary table.

It is yet another aspect of the present invention to provide tables for decoding Huffman coded data. The tables of the present invention include at least one primary table and may include one or more secondary tables.

It is one aspect of the present invention to provide tables for decoding Huffman coded data, where the primary table is a look-up table of predetermined size and has entries for looking up the most significant bits of a code. In one embodiment of the present invention, each code is found in the primary table. In another embodiment of the present invention, the primary table contains entries corresponding to some of the codes, and offsets to secondary tables of codes having the same prefix as a table entry. It is one aspect of the present invention that each secondary table has a size, in bits, that is just large enough to contain the code of codes having the prefix found in the primary table.

It is another aspect of the present invention to provide a decoding algorithm that is easily implemented on existing embedded devices.

These features together with the various ancillary provisions and features which will become apparent to those skilled in the art from the following detailed description, are attained by the device of the present invention, preferred embodiments thereof being shown with reference to the accompanying drawings, by way of example only, wherein:

BRIEF DESCRIPTION OF THE DRAWING

FIGS. 8A, 8B, 8C, and 8D is an example of look-up tables of the present invention for the code of FIG. 4, where FIG. 8A is a primary table, FIG. 8B is a first secondary table, FIG. 8C is a second secondary table, and FIG. 8D is a third secondary table;

FIG. 11 is a schematic of the parts of a data block of a dynamic Huffman code.

Reference symbols are used in the Figures to indicate certain components, aspects or features shown therein, with reference symbols common to more than one Figure indicating like components, aspects or features shown therein.

DETAILED DESCRIPTION OF THE INVENTION

Described herein are an inventive method and an inventive device for decoding compressed data more efficiently than do prior art techniques, and is particularly applicable for use on electronic devices having limited resources, such as a limited amount of memory, computing limited to slow processing speeds or lacking in high-precision arithmetic functions, such as floating point processing, or slow transfer times for providing compressed data to the processor. Such devices include, but are not limited to cell phones, personal digital assistants, and portable game machines.

Figure 5:
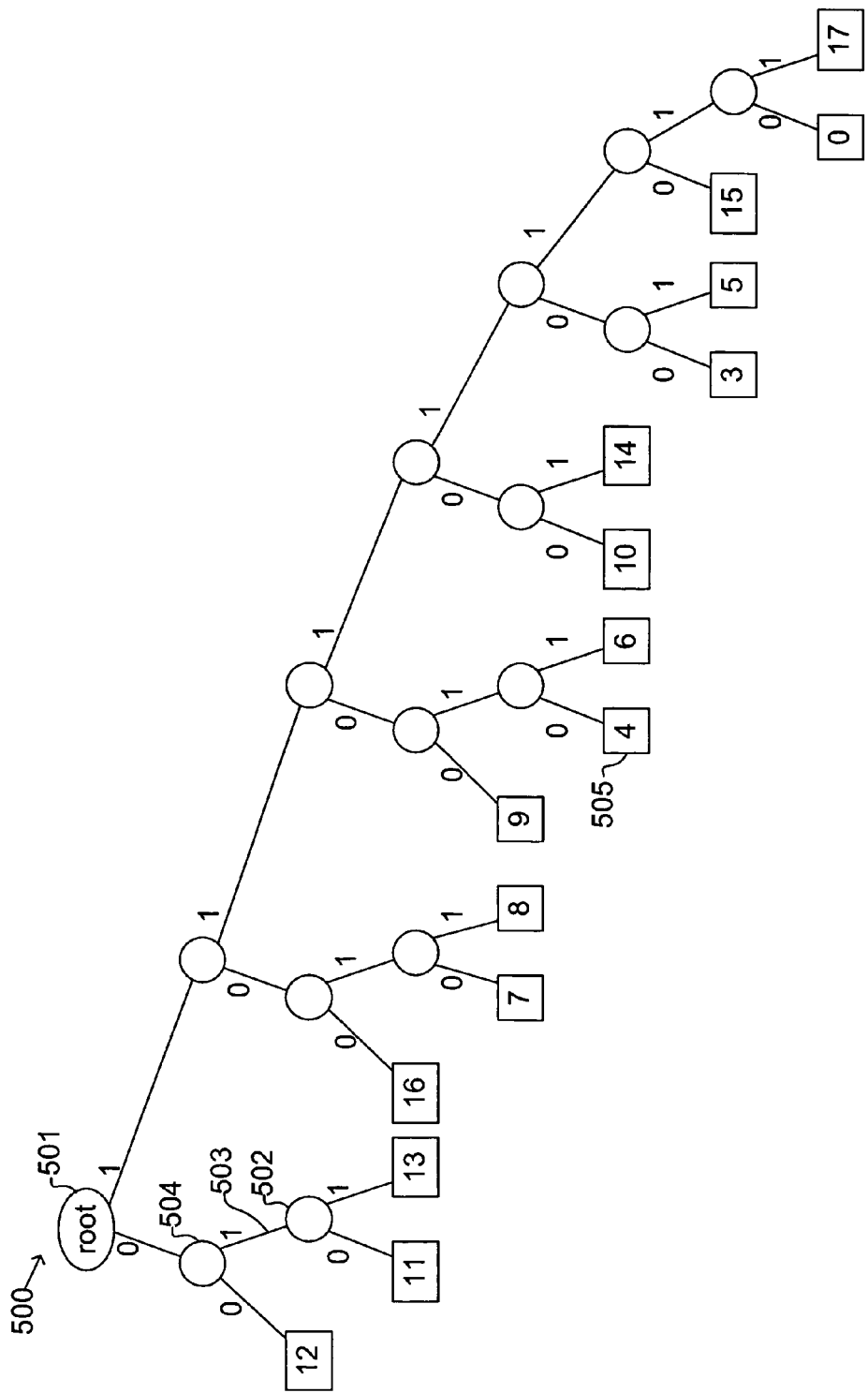
FIG. 5 is a prior art binary tree for decoding the Huffman code of FIG. 4.

More specifically, the present invention decodes prefix entropy coded data, for example by using a Huffman coding scheme, with one or more look-up tables (to be contrasted with the prior art parsing by binary look-up trees shown in FIG. 5). The use of the tables of the present invention reduces memory requirements, specifically due to reordering data during decompression, and better utilizes processor capacity by eliminating processor waiting for slow memory speeds.

The invention is described herein with reference to embodiments for decoding compressed data on game machines. The invention is not limited to these embodiments, as will become apparent to those in the art upon consideration of the following description. Thus, for example, the decoding of the present invention can be incorporated, in general, into general purpose computing or networking devices or in other applications requiring decoding or decompression of data.

Figure 1A:
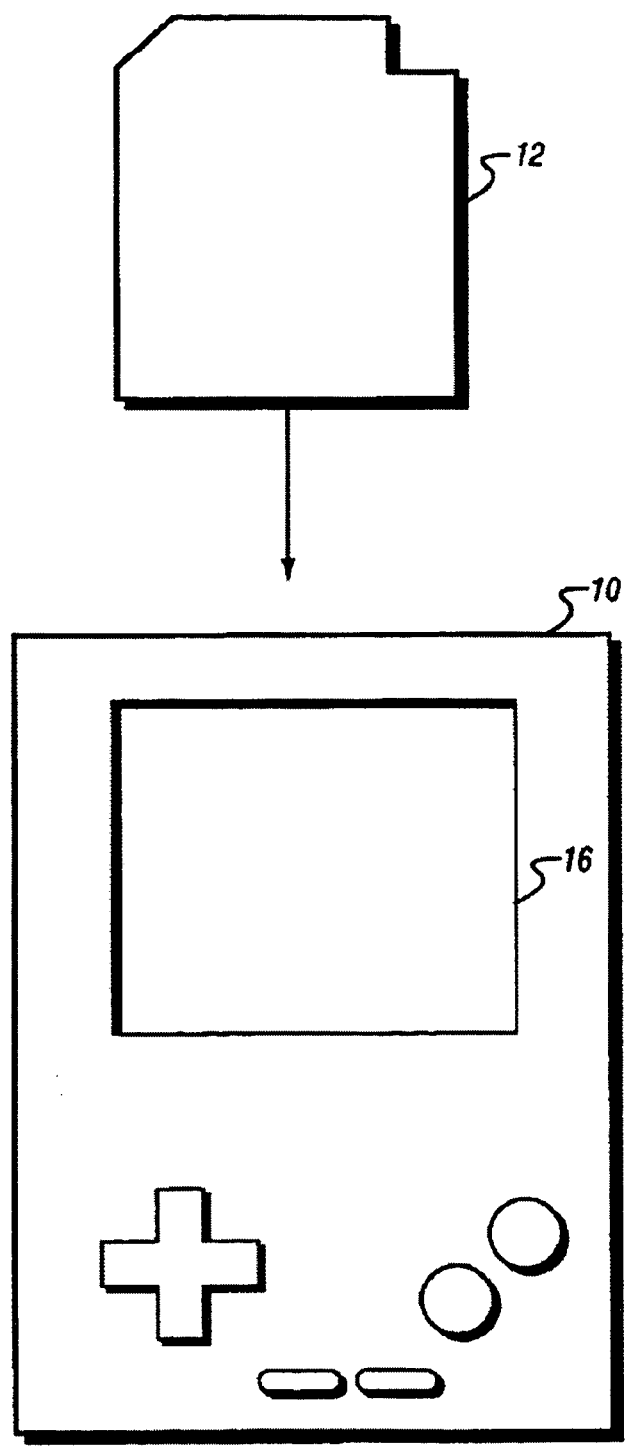
FIGS. 1A-1C show a prior art portable (handheld) game machine.
Figure 1B:
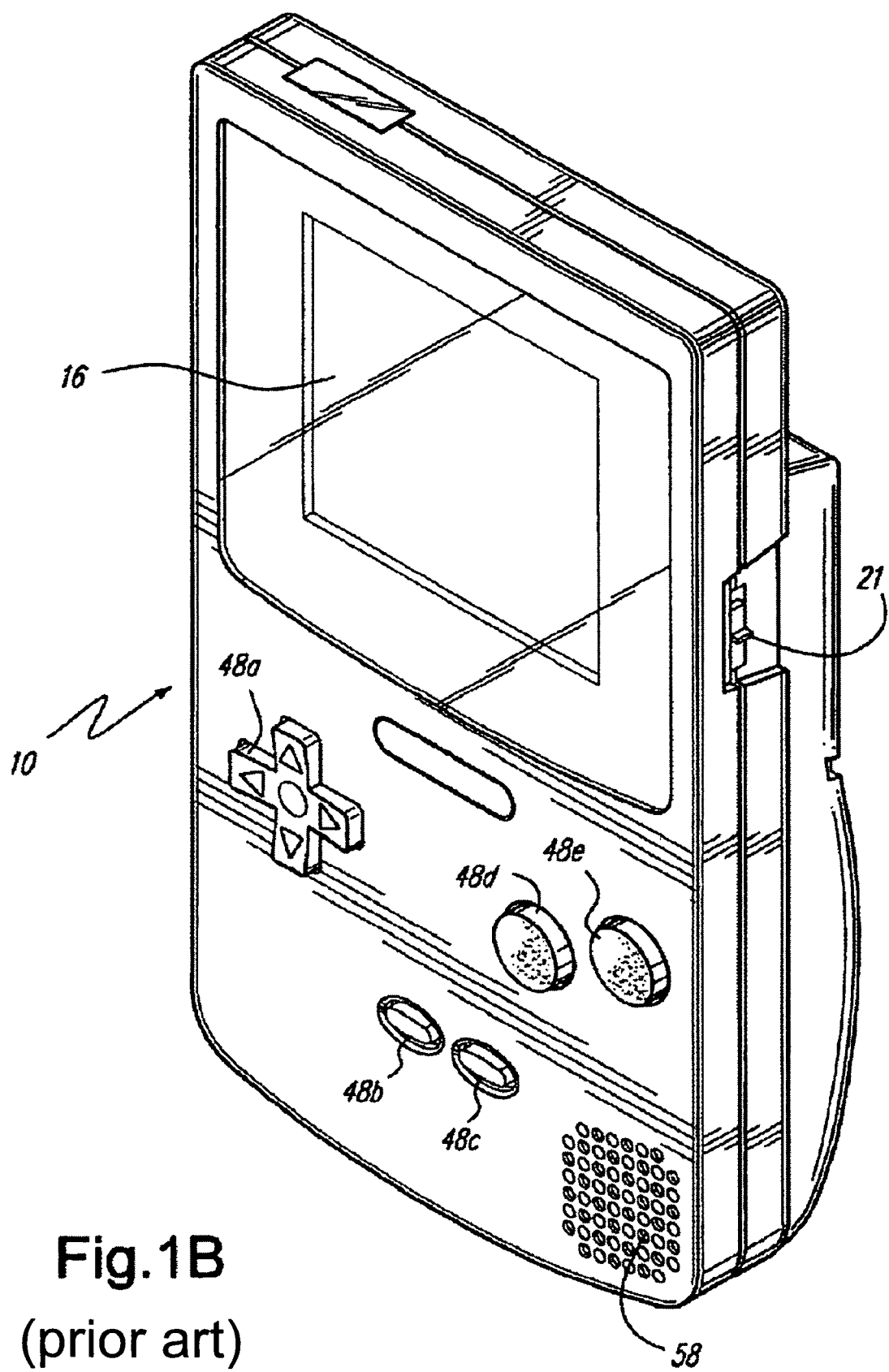
Figure 1C:
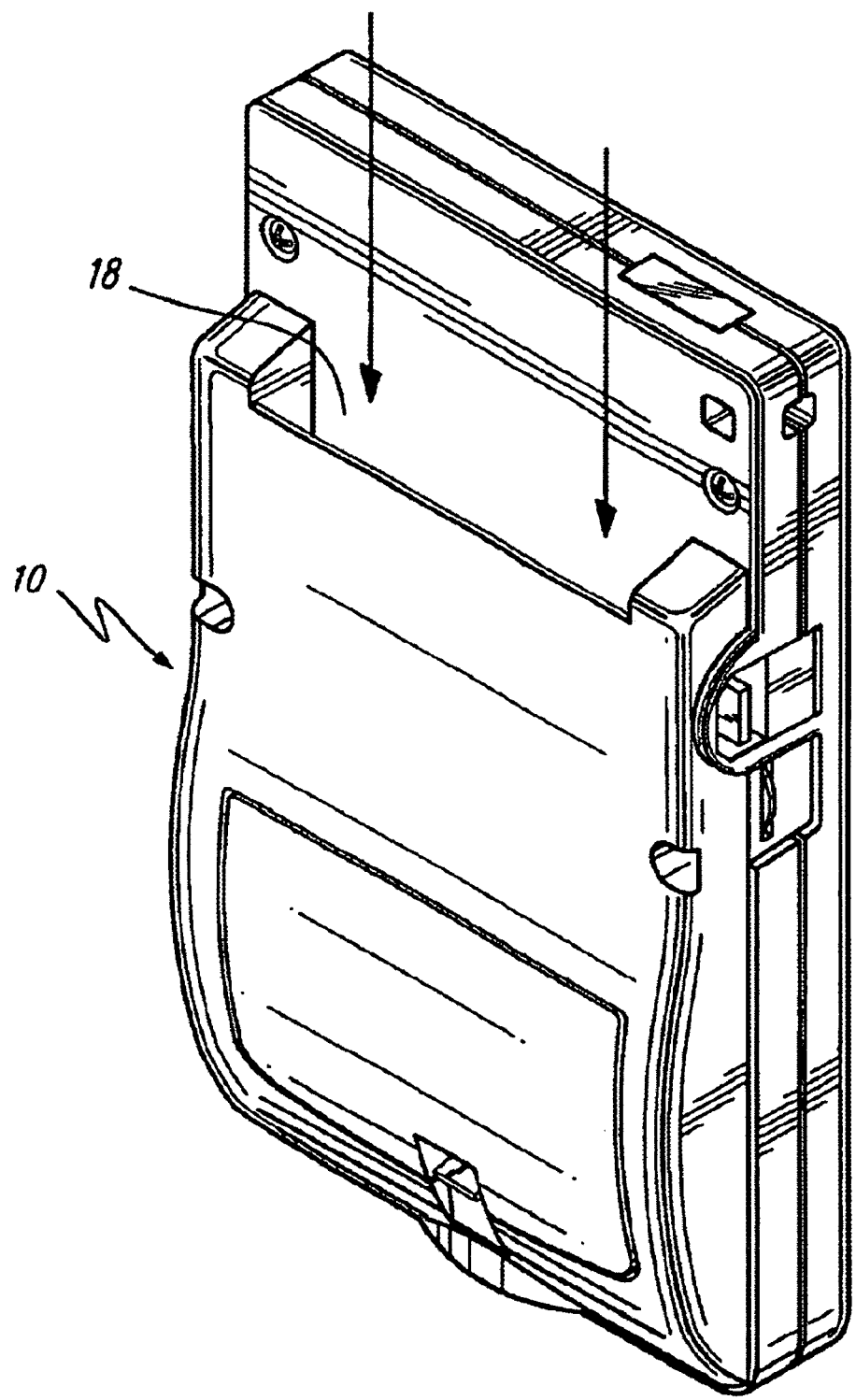
Figure 2:
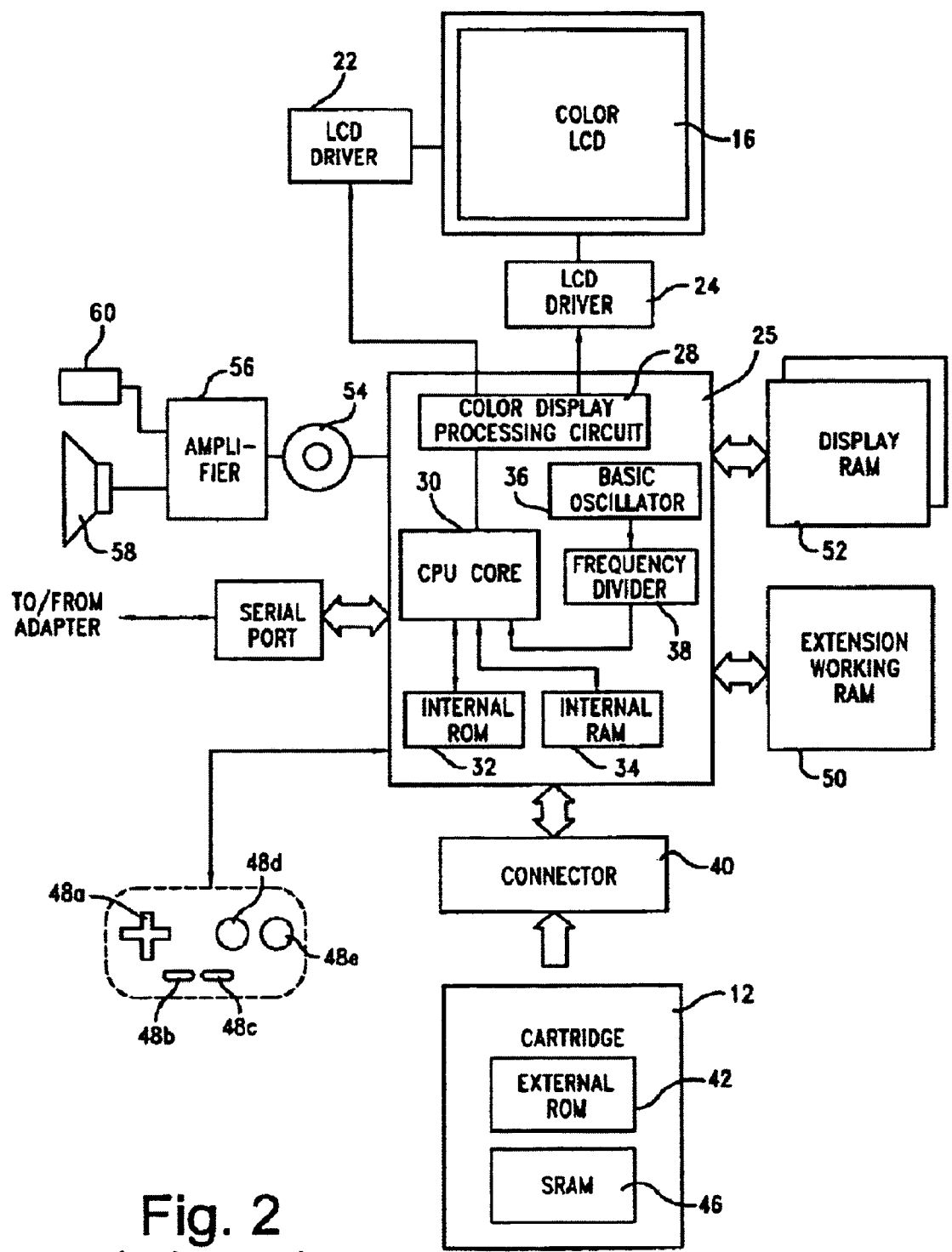
FIG. 2 is a prior art overall block diagram of the game cartridge and the game machine shown in FIGS. 1A-1C.
Figures 3A, 3B:
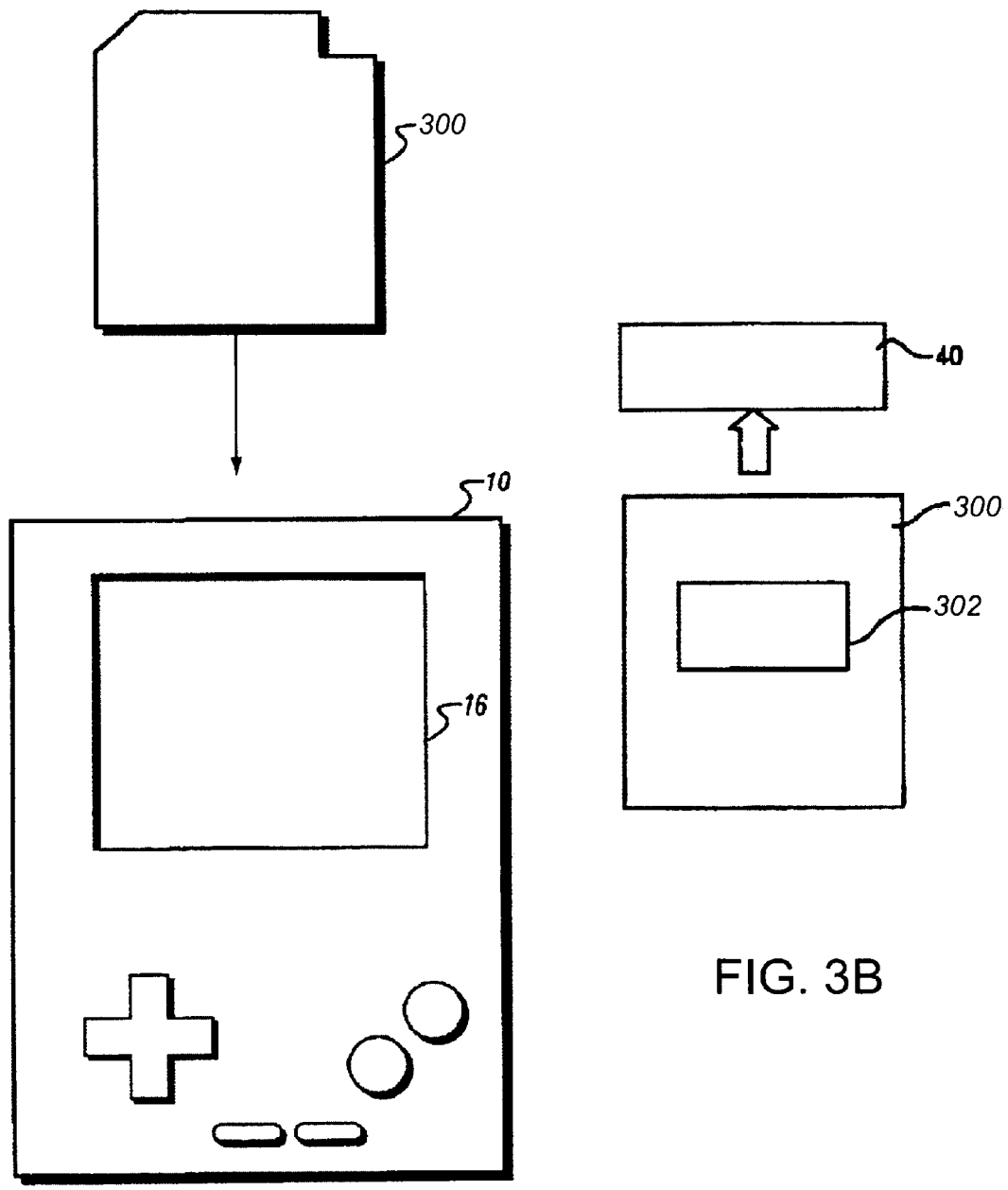
FIG. 3A is a game cartridge of the present invention and a prior art hand-held processing unit.
FIG. 3B is a block diagram of the game cartridge of the present invention.
Figure 4:
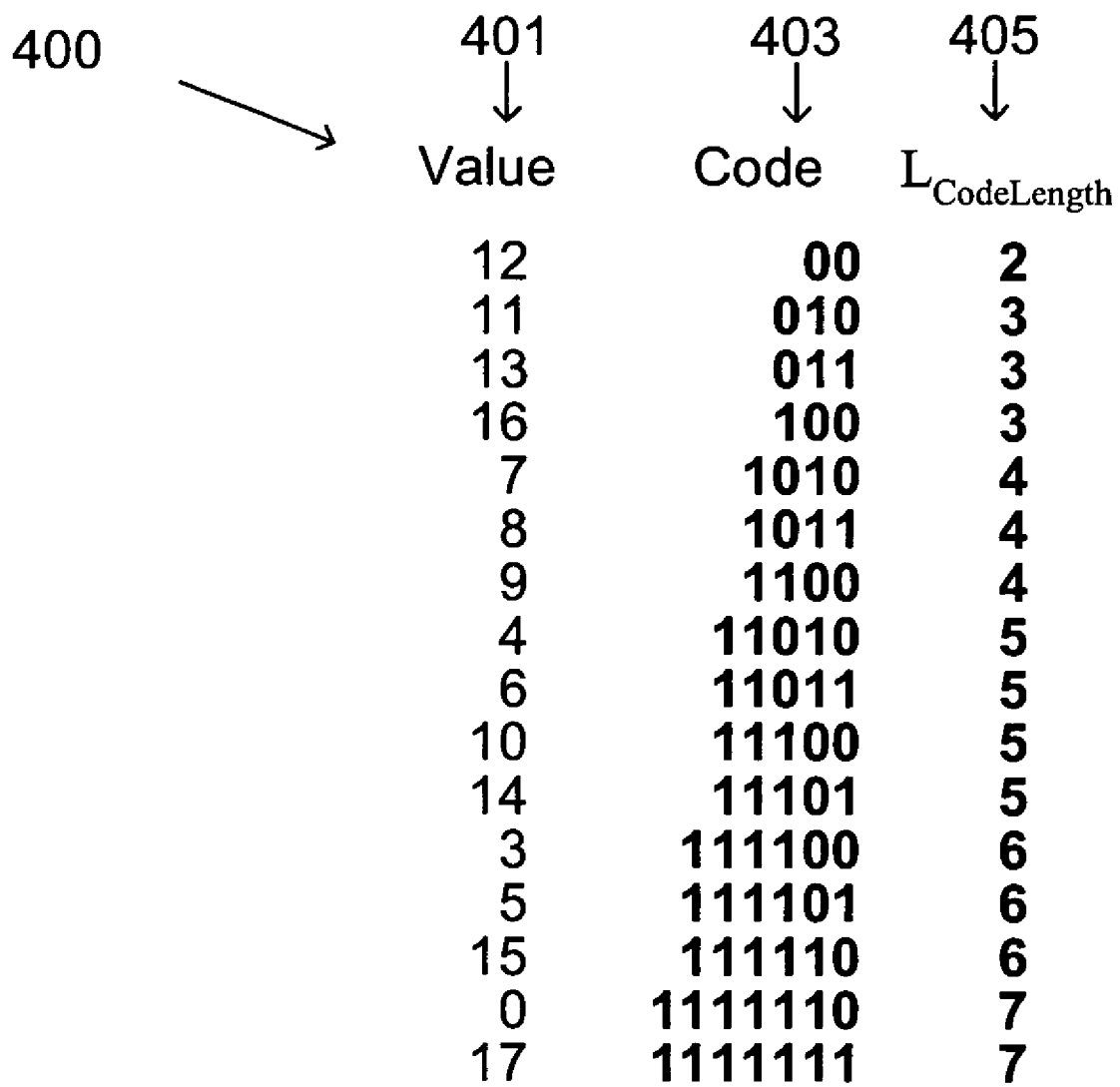
FIG. 4 is a table showing a specific example of a Huffman code.

One embodiment of the present invention is shown in FIG. 3A as an illustration of a game cartridge 300 of the present invention adapted for insertion into a prior art game machine 10. As shown in the schematic block diagram of FIG. 3B, game cartridge 300 has a memory 302 that includes programs for operating game machine 10 and data files containing video and sound for display on the game machine, where the programs and data files are provided in accordance with the methods, data structure, and/or programs of the present invention. Thus, game cartridge 300 mates with connector 40, as shown in FIG. 3B, which is connected to CPU 25 for controlling game machine 10.

As described subsequently, compressed data generated, that is compressed using algorithms that include entropy coding, are stored on game cartridge 300. The decoding methods of the present invention, described subsequently with reference to FIGS. 6A-6C, for example, are also programmed into game cartridge 300 to allow game machine 10 to read and decode the compressed data stored on the game cartridge. As a result of the data processing by CPU 25, sound or video are generated on game machine 10.

In general, the present invention provides for looking up prefix codes having a range of code lengths, with a maximum length, in bits, of $Code_{Max}$. In one embodiment of the present invention, values are provided with prefix coded values, such as a Huffman code. With the code for each value thus determined, each code has a length $L_{CodeLength}$ that is less than or equal to $Code_{Max}$. The present invention includes a first, or primary table for each code that includes an array of table entries. Importantly, the primary table has a size in bits, say B bits, and an index that is B bits in length and that can refer to any one of the $2^B$ elements in the table. The value of B can either be predetermined, or can be determined upon decoding and can be less than or equal to the maximum length, $Code_{Max}$. The index is used to look-up code strings by aligning the most significant bit of the table entry with the first bit of a code string. Codes having a length, in bits, less than the primary table size can be directly looked up in the primary table and may have two or more table entries. Codes having a length, in bits, equal to the primary table size will each have one table entry.

If any of the codes are longer, in bits, than the primary table size, then they are not uniquely represented in the primary table. These longer codes will have a prefix of B bits that corresponds to an ambiguous table entry, that is, the B bits correspond to the first B bits of two or more codes. Each primary table entry corresponding to two or more codes includes a pointer or offset to a secondary table that includes an entry for each of the two or more codes having the same B bit prefix. Each of the secondary tables is also a fixed number of bits long, where the number of bits is just long enough to contain each ambiguous corresponding entry of the primary table. The secondary table reads the next string bits corresponding to the size of the secondary table, and uses those bits to finish decoding.

In general, if the size of the primary table is equal to or larger than the longest code length, then all of the codes will be found at least once in the primary table. If the size of the primary table is less than the longest code length, then there will be at least one secondary table. The number and size of each secondary table will depend on the primary table size, the distribution of code lengths of the code, and the allowed size of the secondary table sizes.

Figure 6A:
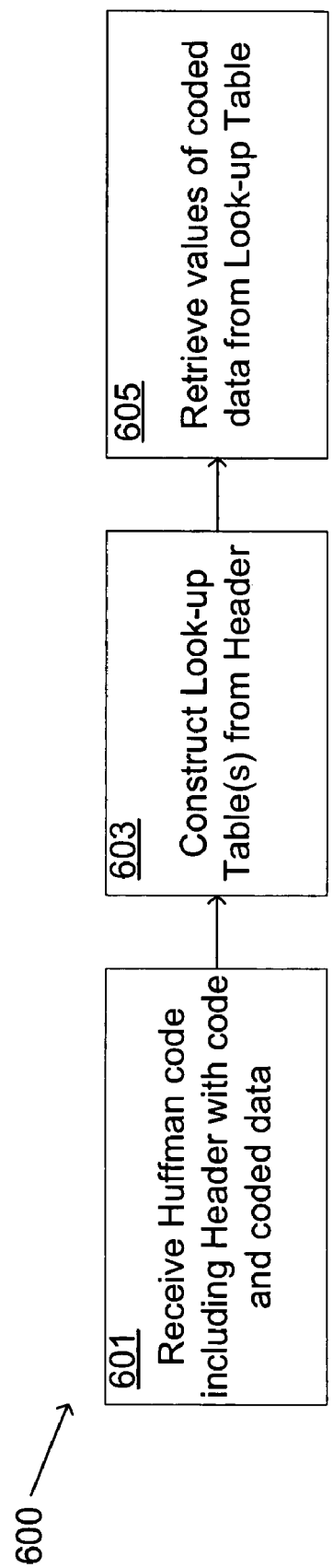
FIG. 6A is a flowchart of one embodiment of the present invention for decoding a Huffman code.
Figure 6B:
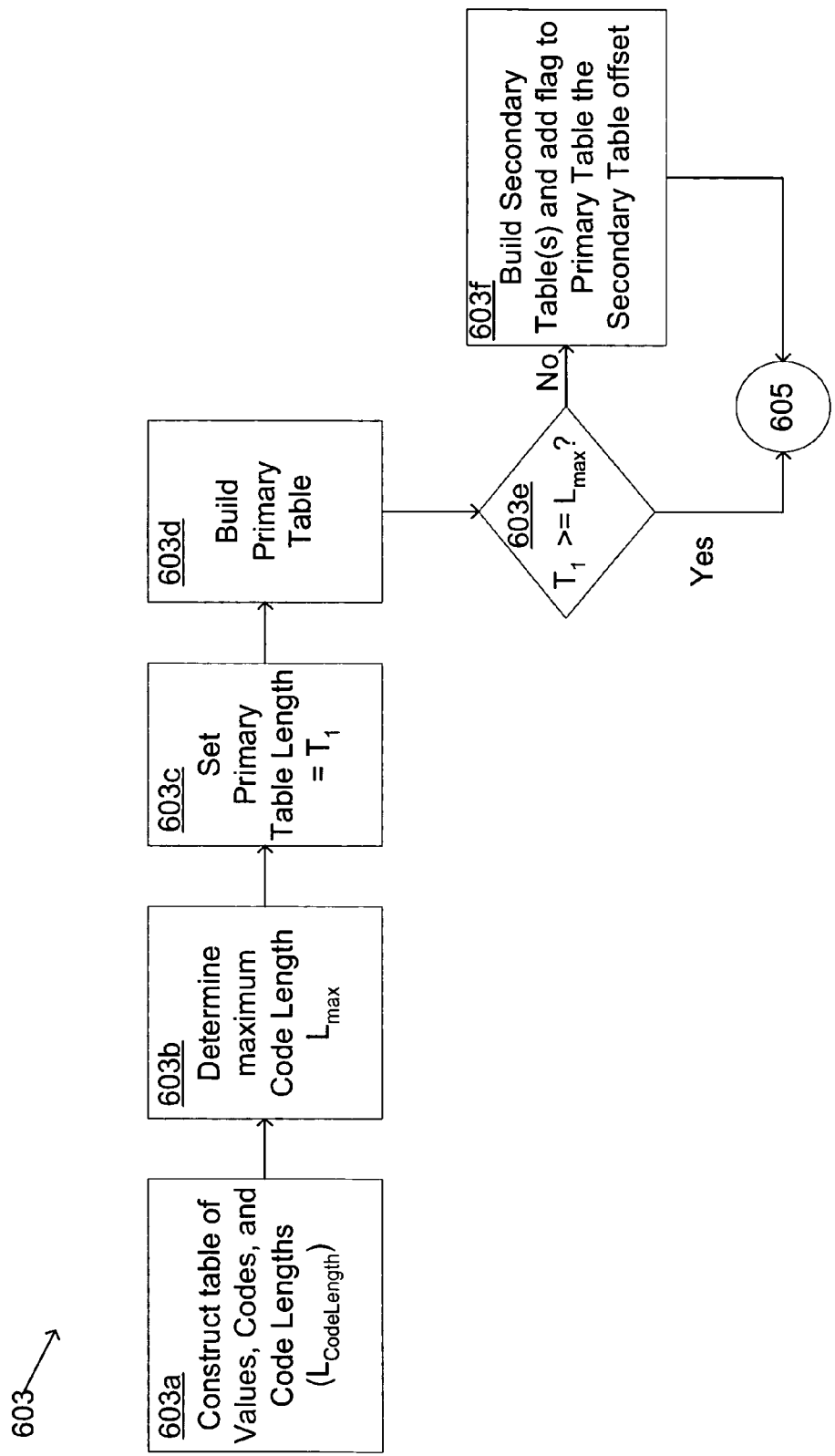
FIG. 6B is a flowchart of the table construction of FIG. 6A.

The algorithm of the present invention is better understood with reference to specific embodiments, which are not meant to limit the scope of the present invention. FIGS. 6A and 6B contain a flow chart 600 illustrating the decoding of entropy coded data according to a first embodiment of the present invention. As described subsequently, the code of flow chart 600 assumes an entropy coding algorithm including, but not limited to Huffman coding.

As shown in FIG. 6A, Huffman coded data, including a header with information regarding the code and coded data is retrieved (Block 601). The information in the header is then used to construct one or more look-up tables (Block 603). The bits of the coded data are then looked up in the one or more tables to determine the code value (Block 605).

The construction of the look-up table of Block 603 is illustrated in greater detail in FIG. 6B for Huffman coded data. First, a table of values, codes and code lengths is constructed for each code value of the specific Huffman code (Block 603a). The step of Block 603a is well known, and is described, for example, in the DEFLATE specification as part of the process of generating a binary look-up tree. The remaining steps illustrated in FIG. 6B are not well known and represent the inventive construction of the look up table. Thus, after the construction of Block 603a, the maximum code length $L_{max}$, in bits, is determined from the table of individual code lengths (Block 603b) and, in Block 603c, a primary table of length $T_1$ bits is selected. The selection of the value of $T_1$ can be predetermined, or can be calculated from the code or from some external input. The primary table is next built (Block 603d) as a table of $T_1$ bits having $2^{T_1}$ entries.

It is next determined if one or more secondary tables are needed (Block 603e). If the primary table size, in bits, is greater than or equal to the maximum code size ($T_1 \geq L_{max}$), then the primary table index can take on any one of the codes. The primary table thus contains all codes, no secondary tables are required, and Block 603e directs the processes through "Yes" to Block 605. Since the number of entries in the primary table ($2^{T_1}$) is much greater than the number of values coded in the Huffman code, there will be more than one table entry for some of the codes, as discussed subsequently.

If the primary table size is less than the maximum code size, then the primary table cannot contain all of the codes, and secondary tables are required, and Block 603e directs the process through "No" to build one or more secondary tables (Block 603f). As described subsequently, the number of secondary tables and the size of each secondary table, in bits, depends on the primary table size and the number and distribution of the codes and code lengths.

In an alternative embodiment, $T_1$ is set in Block 603c to be no larger than $L_{max}$, and since no secondary tables are required, the decision of Block 603e is not needed.

As an illustrative example, a 4-bit primary table includes $2^4=16$ table entries represented by the binary numbers 0000 through 1111. Table entries are used to look up prefix (that is left-shifted) codes. Thus, if 01 is one of the Huffman codes, for example, any table entry from 0100 through 0111 is interpreted as corresponding to prefix code 01 of code length 2 bits. The next code begins with the third bit, for this example, and the code length is used to save the remaining bits for later interpretation.

Thus any code having a length of less than $T_1$ (4 bits, for this example), has more than one corresponding table entry, and any code having a length equal to $T_1$ has one table entry. If any code has a length greater than $T_1$, then its value is found in one of the secondary tables. Specifically, if the code is greater than $T_1$ bits, the primary table entry equal to the first $T_1$ bits indicates which secondary table the code is to be found in. In one embodiment of the present invention, the code length entry indicates the maximum code size of the secondary table, say $T_2$, and the entries of the secondary table correspond to the next $T_2-T_1$ bits of the string being decoded. Thus the secondary tables have sizes determined by the code and primary table size that can be from 1 bit to $L_{max}-T_1$ bits in length. In general, the size $T_2$ depends on the secondary table entries and may vary from one secondary table to another.

Figure 7:
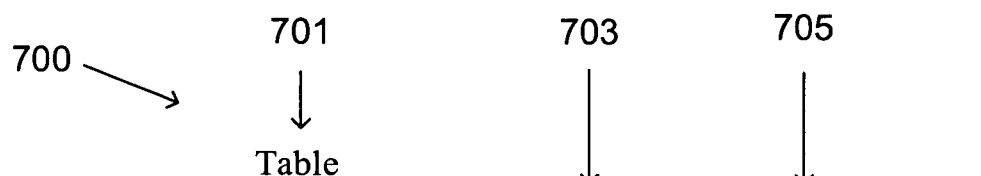
FIG. 7 is an example of a look-up table of the present invention for the code of FIG. 4 using only one, primary table.

The construction of the look-up tables of the present invention is better understood by reference to specific examples. For purposes of this discussion, FIG. 7, and FIGS. 8A-8D, are two look-up tables of the present invention constructed for the same code (that of table 400) with different primary table lengths. Specifically, FIG. 7 is a first example of a look-up table 700 consisting of a primary table, and FIGS. 8A-8D is a second example of look-up tables as a $T_1=4$ bit primary table 800 (FIG. 8A), a first secondary table 810 (FIG. 8B), a second secondary table 820 (FIG. 8C), and a third secondary table 830 (FIG. 8D). These examples are for illustrative purposes, and are not meant to limit the scope of the present invention.

An example of a primary table of size $T_1=L_{max}$ bits is shown in FIG. 7, where primary table 700 corresponds to the code of table 400, having column 701, containing table entries, or index I, and columns 703 and 705 containing code values and code lengths, $L_{CodeLength}$ corresponding to index I, interpreted as in the previous paragraph. The code of table 400 has a maximum code length of $L_{max}=7$, and thus the length of table 700 is $2^7=128$. The index I can thus take on binary values from 0000000 to 1111111, corresponding to a range of from 0 to 127, as indicated in column 701. Since primary table 700 is large enough to accommodate any code of table 400, only one look-up table is required.

The prefix (left-most digits) of each index in table 700 corresponds to one of the prefix codes of table 400. Thus, for example, the smallest code of table 400 is the 2 bit code 00, which represents a value 12. The first 32 indices of table 700 are the binary numbers 0000000 through 0011111, where ellipses indicate entries not shown. The 2 most significant digits (the left-most digits) are the code 00, which corresponds to the value "12," while the remaining 5 bits take on the 32 values of a 5-bit binary number. The indices having a 00 prefix are assigned values of "12" in column 703 and the corresponding code length "2" in column 705.

As an example of decoding strings, assume, for example, that the next $L_{max}=7$ bits of a code according to table 400 are read as "0010101" This string may contain either one code of length $L_{max}$ or a code of smaller length, starting from the leftmost bit, followed by more coded bits. Continuing with this example and with reference to the code of table 400, the possible codes starting with the leftmost bit are 0, 00, 001, 0010, 00101, 001010, and 0010101. Of these 7 strings, only 00 corresponds to one of the codes of table 400 (the code value "12"). The remaining bits, 10101, are the beginning of the next coded values, the decoding of which may require the reading of additional bits to the right of the remaining bits.

An example of the use look-up tables where $T_1<L_{max}$, having one primary table and at least one secondary table, is shown in FIGS. 8A-8D. Specifically, the present invention provides 3 secondary tables for the code of table 400 and a primary table size of 4 bits. Each table 800, 810, 820, and 830 has a first column having a table entry, or index I (columns 801, 811, 821, and 831, respectively), a second column having a code value (columns 803, 813, 823, and 833, respectively), and a third column having a code length (columns 805, 815, 825, and 835, respectively). As described subsequently, columns 803 and 805 either contain reference to an actual code value and code length for code lengths less than or equal to the primary table size, or are used to reference one of the secondary tables 810, 820, or 830. The numbers in columns 813, 815, 823, 825, 833, and 835 contain references to code values and lengths. In general, the size of each secondary table depends on the distribution of code sizes in the code and the size of the primary table.

Primary table 800, which is a 4-bit table, has table entries I from 0000 to 1111. As described previously with respect to table 700, the most significant bits are compared with the code of table 400 to generate the primary table. Specifically, table entries from 0000 to 1100 correspond to one of codes 00, 010, 011, 100, 1010, 1011, or 1100, with corresponding values 12, 11, 13, 16, 7, 8, and 9, as shown in columns 801 and 803. The next table entry of table 800 is 1101, which are the most significant bits of codes 11010 and 11011, both of which cannot both be contained in a single entry of the primary table. Since primary table entry 1101 can refer to two codes, a 1-bit size secondary table is sufficient to accommodate the two codes having that prefix. Specifically, the value of table entry 1101 is provided with an offset, or alternatively with a pointer, to first secondary table 810 which has a table size of 1 bit, as indicated in columns 803 and 805. The complete decoding of any code starting with the bit sequence 1101 requires one more bit to be read, and table 810 contains the values and code lengths for values 4 and 6. Likewise, the value of table entry 1110 of table 800 corresponds to the most significant bits of the codes of values 10 and 14 (see table 400), and thus table entry 1110 of table 800 points to second secondary table 820. The complete decoding of any code starting with the bit sequence 1110 requires one more bit to be read, as indicated in column 803, and secondary table 820 uses the next bit as a look-up to values 10 and 14.

Lastly, the value of table entry 1111 of table 800 corresponds to the most significant bits of the codes of values 3, 5, 15, 0, and 17, and thus table entry 1111 of table 800 points to third secondary table 830. The complete decoding of any code starting with the bit sequence 1111 requires three more bit to be read, as indicated in table 820, which contains the values and code lengths for values 10 and 14. Since the prefix 1111 that directs the lookup to secondary table 830 includes codes having up to 3 additional bits (a 7-bit code less the 4 bit prefix), the third secondary table has a 3-bit secondary table having $2^3=8$ entries.

It is thus seen that the secondary table size can range from 1-bit to $L_{max}-T_1$ bits, depending on the distribution of code sizes.

Figure 6C:
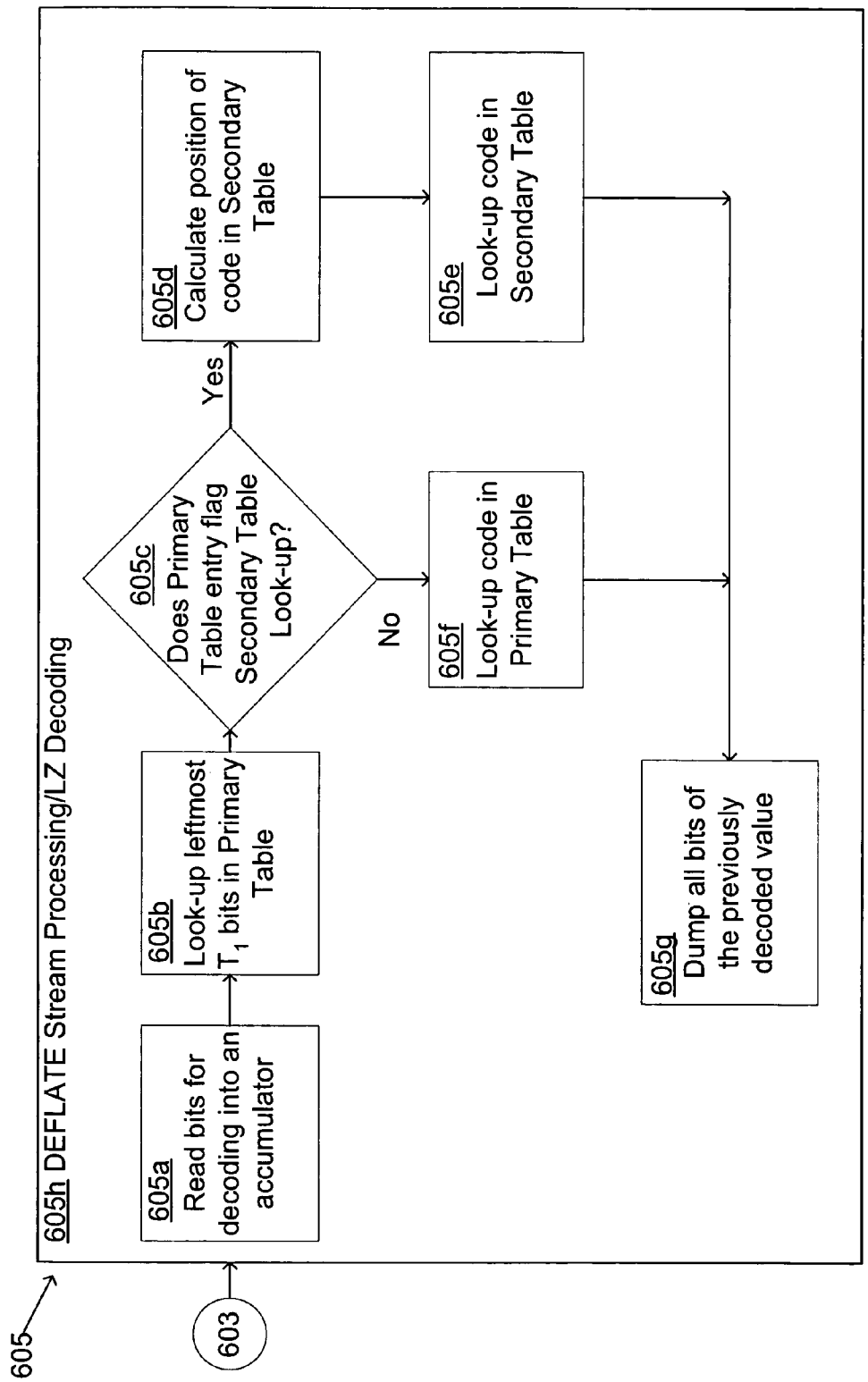
FIG. 6C is a flowchart of the look-up procedure of FIG. 6A.

The decoding of bit strings according to the present invention is now described with reference to FIG. 6C. For illustrative purposes, the discussion of FIG. 6C will include specific examples that are not meant to limit the scope of the present invention, and include a first example having only a primary look-up table (table 700) and a second example having a primary table (table 800) and secondary tables (tables 810, 820, and 830).

After the look-up tables are built, coded strings are processed and decoded. The process includes part of the DEFLATE stream processing/LZ decoding (Block 605h), as described in the DEFLATE specification, along with the modifications described with reference to Blocks 605a-605g. A string of bits is read for decoding (Block 605a). In one embodiment the bits are held in a memory location (an "accumulator") that, in turn, reads a number of bits from the encoded string, decodes the next value, and then discards bits corresponding to the decoded value. The number of bits must be at least as long as the length of code string being currently decoded. When decoding the beginning or middle of a string of coded bits, the code length is not known, and the number of bits processed must be at least as large as the maximum code size, $L_{max}$.

Next, the left-most $T_1$ bits are read (looked up) from the accumulator (Block 605b). For bit combinations found within the most significant bits of the primary table, the primary table does not flag the use of a secondary table, and the table contains the value and code length of a coded bit string. That is, when the code length of the next coded value is equal to or less than the number of bits of the primary look-up table, the left-most $T_1$ bits correspond to an actual code value and code length in the primary look-up table. This is the case for any of the codes using table 700 or codes for table entries 0000 through 1100 of table 800. With no flag to a secondary table, the result of Block 605c is a "No," and the $T_1$ bits are used to look up a code value in the primary table (Block 605f). As an example, if the accumulator holds the string 0000001, then this value as an index is the second row in table 700 or, alternatively, the first row of table 800. In either case, the indicated string value is "12" and code length is "2." The 2 bits of the decoded value are next dumped from the accumulator (Block 605g). Thus, for example, the string in the accumulator can be left-shifted by 2 bits. The next group of bits are read (Block 605a) and placed behind any unread bits.

When the code length of the next coded value is greater than the number of bits of the primary look-up table, the left-most $T_1$ bits point to a primary table location that indicates the position of the appropriate secondary table. With reference to the tables of FIGS. 8A-8D, for example, if the accumulator contains the string 1101101, then the left-most 4 bits provides an index of 1101, which is the $14^{th}$ entry in table 800, giving an offset to first secondary table 810. The result of Block 605c is "yes," and the position in the secondary table is next calculated (Block 605d). In one embodiment of the present invention, the offset information is contained in the value and code lengths of the primary table, and is used to read the next index from the accumulator. In this example, the index 1101 can reference only one of the 2 five-bit codes for the values 4 or 6 (code 11010 or 11011). The value and code length of the $14^{th}$ entry of table 800 provide an offset to first secondary look-up table 810, and indicate only the next 1 bit need be read to determine the code value. Thus table 810 is a 1-bit look-up table. The offset and the next string bit thus provide the position in the secondary look-up table, where the code value and length are accessed (Block 605e).

Figure 9:
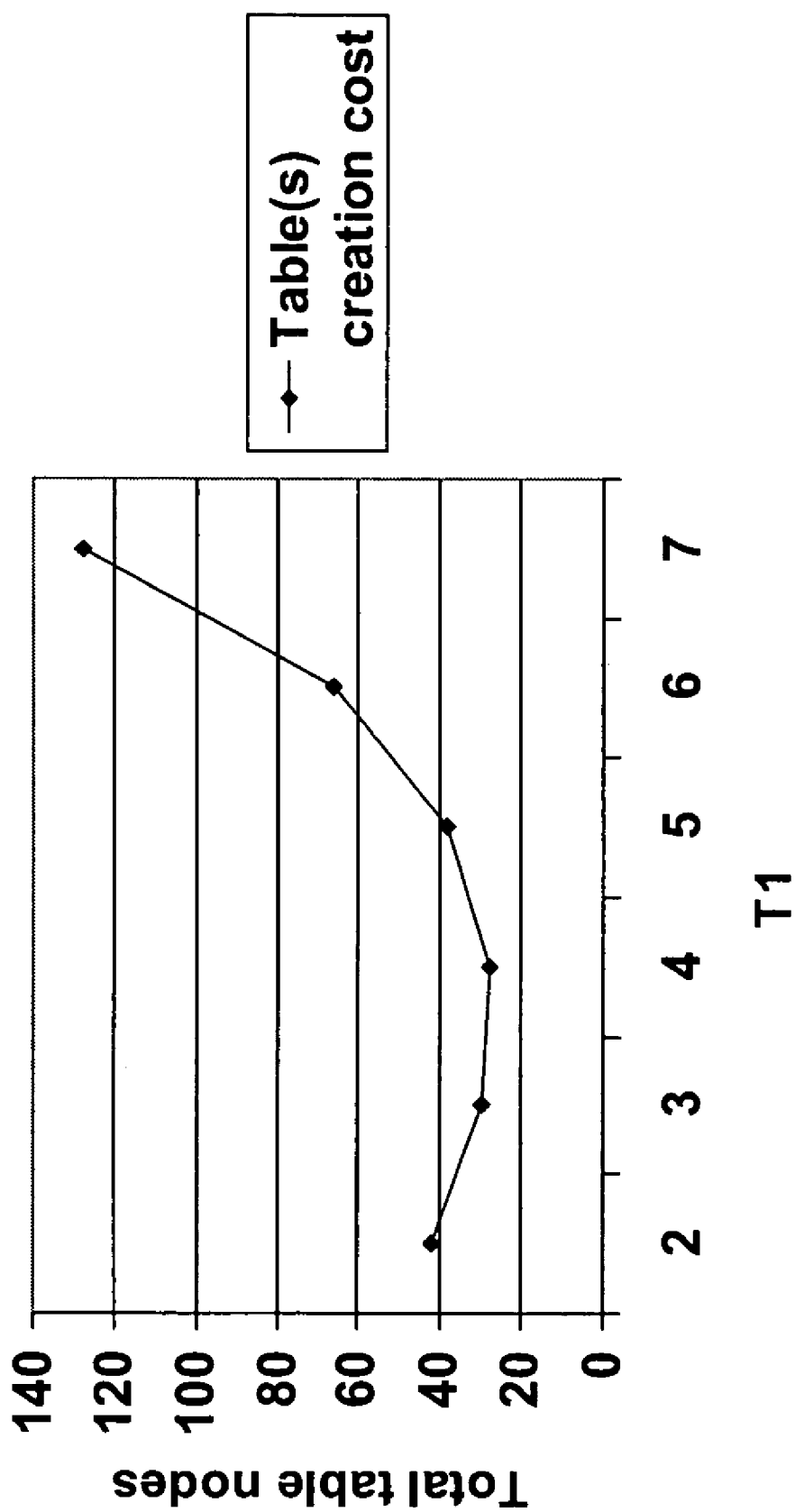
FIG. 9 is a graph of the total number of primary and secondary table nodes as a function of the size of the primary table.

The size of the primary table $T_1$ can be selected to have a value between the largest and the smallest code size. Once $T_1$ has been set, the length of each secondary table depends on the code length distribution and the size of the primary table length. As an example, the graph of FIG. 9 shows the total number of primary and secondary table nodes as a function of the primary table size, in bits. Thus, for the example of the code of table 400, a 7-bit primary look-up table would have a total of 128 entries, a 4-bit primary table has two, 1-bit secondary tables 810 and 820, and a 3-bit secondary table 830, for a total of 28 entries, and a 3-bit primary table one 1-bit, one 2-bit and one 4-bit secondary table, for a total 30 entries.

Larger values of $T_1$ require more time and memory for generation of the tables, but have smaller secondary table accesses. With $T_1=L_{max}$ only one large, primary table is generated. In general, the selection of the value of $T_1$ is a balance between memory, tables' creation time, the distribution of code lengths distribution, and look-up time. The choice of $T_1$ provides a variable for optimizing the decompression of a code on systems having limited memory or computational resources.

In one embodiment of the present invention, $T_1$ is fixed to an optimal, predefined value prior to compression, and in another embodiment $T_1$ is selected on compression to provide optimized performance. The selection depends, to a first order, on the total number of table elements for a given $T_1$ and the frequency distribution for each code. The choice of $T_1$ also depends on the decompression implementation chosen. It has been found that a fixed value of $T_1=8$ accommodates well most of the deflate streams, however different streams may have a different, more optimal $T_1$.

Huffman Table Generation

Figure 10:
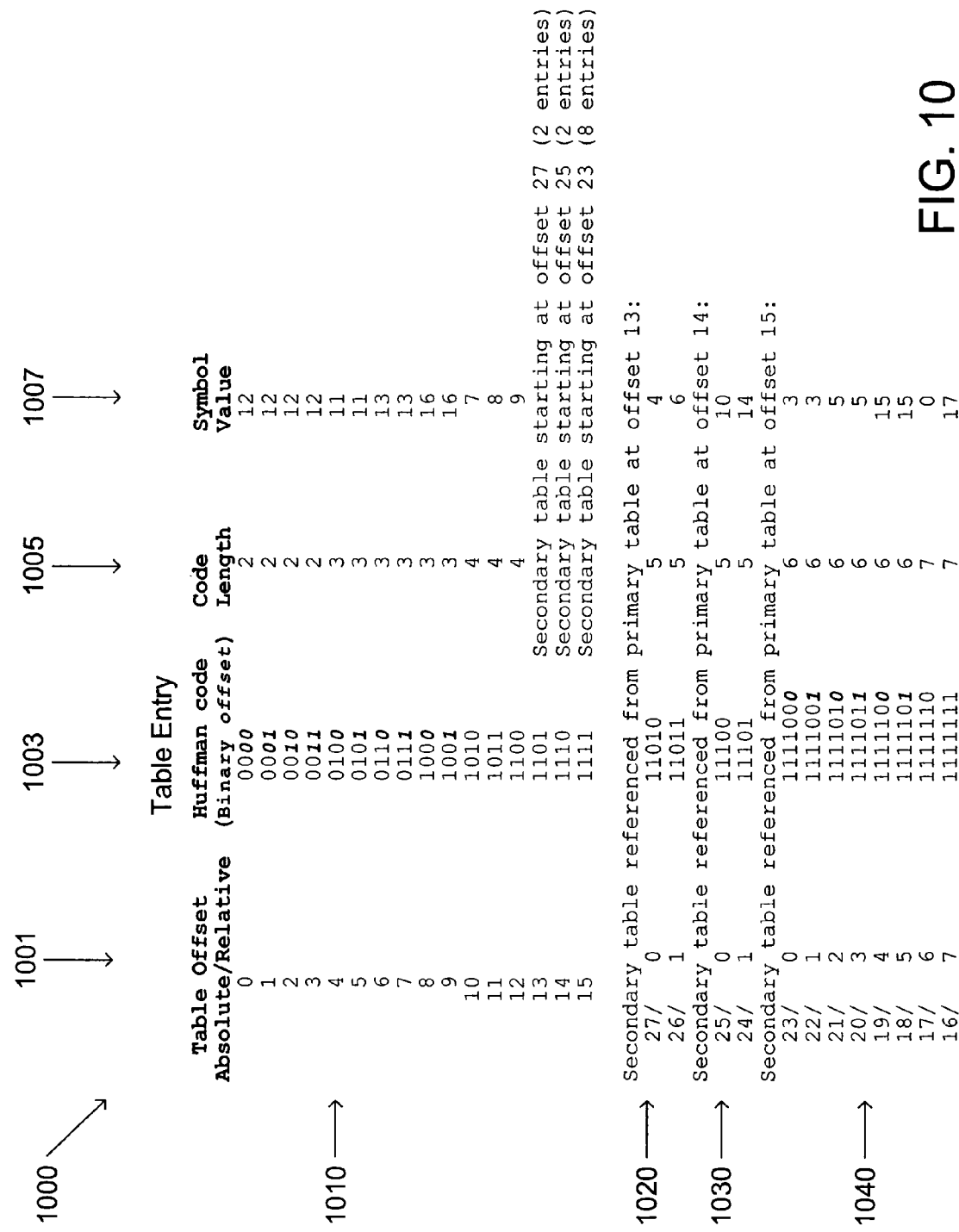
FIG. 10 is a condensed look-up table containing the tables of FIGS. 8A-8D as constructed by the code of Tables I, II, and III.

Tables I lists C++ computer code of common definitions for implementing Blocks 603 and 605, Tables II, and III lists further C++ computer code for implementing the table generation of Blocks 603 and 605, respectively, and FIG. 10 is a table 1000 showing the example of the tables generated for the code of table 400 for the 4-bit primary table corresponding to the tables of FIGS. 8A-8D. The code of Tables I, II, and III generates a single table that has a primary table 1010, followed by a first secondary table 1020, a second secondary table 1030, and a third secondary table 1040. The entries of table 1000 correspond to those of tables 800, 810, 820 and 830 arranged consecutively in computer memory. The columns of table 1000 are an offset (column 1001), a table entry (column 1003), where the bits in black are the symbol's actual Huffman code and the grayed out bits are bits that can be read when reading the $T_1$ bits (for the primary table) or S-$T_1$ bits (for the secondary tables), a value (column 1005), and code length (column 1007).

TABLE I

Code for Implementation of Block 603 and 605 -
Definitions Common to Blocks 603 and 605

```
enum
{
    Literals         =   256 + 32,
    // 256 characters + 1 escape code (id 256) + 31 run types
    Distances        =   32,
    CodeMaxBits      =   15,
    PrimaryTableBits   = 3,
};
struct HuffmanTableNode
{
    unsigned short    Value : 9;
    unsigned short    Length : 7;
};
struct HuffmanTable
{
    HuffmanTableNode * pRoot;
    unsigned long    SmallestLength;
    unsigned long    LargestLength;
};
```

TABLE II

Code for Implementation of Block 603

```
unsigned long hyCompressionManager::Inflate::CreateDecodeTable (
HuffmanTable * pTable, const unsigned long SymbolsCount, unsigned
char * pSymbolsLengths )
{
        // --------- Sort by length the symbol table (counter sort)
        unsigned char   LengthOccuranceCount[ CodeMaxBits + 1 ];
        memset( LengthOccuranceCount, 0, sizeof ( LengthOccuranceCount
) );
        // --------- CollectSymbolLengths
        unsigned char *   pSymbolLength =   pSymbolsLengths;
        for ( unsigned long Counter = SymbolsCount; Counter > 0; --
Counter )
        {
                ++LengthOccuranceCount[ *pSymbolLength++ ];
        }
        // --------- SortSymbolLengthsPositions
        HuffmanTableNode   SymbolLengthsList[ Literals ];
                // the symbols, sorted by length
        HuffmanTableNode * pSymbolLengthPosition[ CodeMaxBits + 1 ];
                // pointers to the first entry in to table above,
                // for each symbol length
        HuffmanTableNode * pLastPosition =           SymbolLengthsList;
        pTable->SmallestLength      = CodeMaxBits + 1;   // set max value
        pTable->LargestLength       = 0;
        for ( unsigned long Counter = 1; Counter <= CodeMaxBits;
++Counter )          // NOTE: starts at 1 as there're no 0-length symbols
        {
                pSymbolLengthPosition[ Counter ]          =    pLastPosition;
                pLastPosition             +=   LengthOccuranceCount[ Counter ];
                // Also find the smallest and the largest codelength
                if ( LengthOccuranceCount[ Counter ] )
                {
                        if ( Counter < pTable->SmallestLength )
                        {
                                pTable->SmallestLength       =       Counter;
                        }
                        if ( Counter > pTable->LargestLength )
                        {
                                pTable->LargestLength        =       Counter;
                        }
                }
        }
        // ----------- CreateSortedSymbolList
        unsigned long          UsedSymbolsCount        =    0;
        pSymbolLength          =    pSymbolsLengths;
        for ( unsigned long Counter = 0; Counter < SymbolsCount;
++Counter, ++pSymbolLength )
        {
                if ( *pSymbolLength )
                {
                        HuffmanTableNode * pSymbolTableNode =
pSymbolLengthPosition[ *pSymbolLength ]++;
                        pSymbolTableNode->Value       = (unsigned short) Counter;
                        pSymbolTableNode->Length      = *pSymbolLength;
                }
        }
        UsedSymbolsCount          =       pSymbolLengthPosition[ CodeMaxBits ] -
SymbolLengthsList;
        // --------------------------------------------------------
        // Two tables are needed to decode a symbol:
        // - The first one will lookup the symbol's first
        // PrimaryTableBits bits. Statistically, there are many
        // chances that the lookup will end here.
        // - If the symbol code is longer, a second table is needed.
        // Several secondary tables may be created.
        long CodeDecal = 1 << ( PrimaryTableBits - pTable-
>SmallestLength );
        HuffmanTableNode * pCurrentTableNode         =   pTable->pRoot;
        HuffmanTableNode * pCurrentSymbol            =
SymbolLengthsList;
        unsigned char *   pCurrentLengthOccurence   =
LengthOccuranceCount + pTable->SmallestLength;
        for ( ; CodeDecal && pCurrentLengthOccurence <=
LengthOccuranceCount + pTable->LargestLength; CodeDecal >>= 1 )
        {
                for ( unsigned long SymbolsLeft =
*pCurrentLengthOccurence++; SymbolsLeft > 0;          --SymbolsLeft,
```

TABLE II-continued

Code for Implementation of Block 603

```
++pCurrentSymbol )
            {
                    // ------------- Fill table
                    for ( unsigned long Counter = CodeDecal; Counter > 0;
--Counter )
                    {
                            *pCurrentTableNode++=        *pCurrentSymbol;
                    }
            }
        }
        if ( pTable->LargestLength <= PrimaryTableBits )
        {
            return ( 1 << PrimaryTableBits );
        }
        else
// ------------------------------------ Fill the secondary tables
        {
            HuffmanTableNode *  pNextTableNode           =     pTable->pRoot
+ ( 1 << PrimaryTableBits );
//
            unsigned long  RemainingBits    =       pTable->LargestLength -
PrimaryTableBits;
            unsigned long   InitialRemainingBits =        RemainingBits;
                    pCurrentLengthOccurence            =
            LengthOccuranceCount + pTable->LargestLength;
            unsigned long   CurrentSymbolCode            =     ( 1 << pTable-
>LargestLength ) - 1;
                    CodeDecal           =    0;
                    pCurrentSymbol             =     SymbolLengthsList
+ UsedSymbolsCount - 1;
                    pCurrentTableNode            =    pNextTableNode;
            for ( ; RemainingBits; CurrentSymbolCode >>= 1, --
RemainingBits, ++CodeDecal )
            {
                    for ( unsigned long SymbolsLeft =
*pCurrentLengthOccurence--; SymbolsLeft > 0; --SymbolsLeft,
                                                                        --pCurrentSymbol
                                                        )
                    {
                            for ( unsigned long Counter = 1 << CodeDecal;
Counter > 0; --Counter )
                            {
                                    *pNextTableNode++       =       *pCurrentSymbol;
                            }
                            unsigned long  LastSymbolCode          =
            CurrentSymbolCode >> RemainingBits;
                            --CurrentSymbolCode;
                            if ( ( CurrentSymbolCode >> RemainingBits ) ^
LastSymbolCode )
                            // top PrimaryTableBits bits changed?
                            {
                                    --pCurrentTableNode;
                                    pCurrentTableNode->Length= 32 -
InitialRemainingBits;
                                    // extra bits that need reading
                                    pCurrentTableNode->Value          = pNextTableNode -
pCurrentTableNode - 1;
                                    // offset to first entry in the secondary
                            table
                                    CodeDecal          = SymbolsLeft == 1 ? -1 : 0;
                                    InitialRemainingBits= SymbolsLeft == 1 ?
RemainingBits - 1 :
                                            RemainingBits;
                            }
                    }
            }
            return ( pNextTableNode - pTable->pRoot );
        }
}
```

TABLE III

Code for Implementation of Block 605

```
inline long
        hyCompressionManager::Inflate::DecodeDynamicTableValue  (
const HuffmanTable * pTable )
{
        m_InputStream.FetchBits( CodeMaxBits );
        // Ensure that at least CodeMaxBits bits are
        // available in the cache
        HuffmanTableNode *      pSymbolNode     =     pTable->pRoot
+ ( m_InputStream.Accumulator >> (32 - PrimaryTableBits ));
        if ( pSymbolNode->Length > CodeMaxBits )      // Needs more
data
        {
            pSymbolNode           +=    pSymbolNode->Value - ( (
m_InputStream.Accumulator << PrimaryTableBits >>
                                    pSymbolNode->Length );
        // No more than CodeMaxBits-PrimaryTableBits bits will be read
        //(largest code is CodeMaxBits bits)
        }
        m_InputStream.DropBits( pSymbolNode->Length );
        return ( pSymbolNode->Value );
}
```

The code of Tables I, II, and III first fill the primary table with the smallest codes of table 400, starting with I=0, proceeding through all codes having code size less than or equal to T1—that is all positions in the primary table corresponding to prefix codes are filled in. Next, for each index in the primary table that has a code size greater than $T_1$ (and thus having an offset to a secondary table), the secondary table size is computed as the number of codes having prefixes equal to the index of the primary table. If $L_{MAX} \leq T_1$, the following steps can be skipped, as the primary table is already complete. The secondary tables are then filled in starting with the last secondary table at the bottom and working upwards. Filling in the secondary tables starting at the bottom of table 1000 eliminates the intermediary storage and parsing of values into the table. The result is a table generation process that is faster and that expends less computer resources that an alternative process of calculating all table entries first and then filling in the table from top to bottom.

The use of the code of Tables I, II, and III requires the modification of the header to have a fourth block type to signal the end of the compressed data block.

Decoding Algorithm

One embodiment of the decoding of block 605 is now presented in greater detail, where Table IV contains modifications to DEFLATE for implementing the embodiment.

TABLE IV

Modification of DEFLATE

```
   // 256 characters + 1 escape code (id 256) + 31 run types
   enum
   {
      Literals    =    256 + 32,
      Distances   =    32,
   };
// First value is the base length, the second is the extra bits that
// need to be read from the stream.
// Once read, those bits will be added to the base length
// Min value: 3, Max value: 258
      const unsigned short Inflate::m_BytesToCopy[(Distances-2)*2]
=
   {
       0, 0,             // escape code, not used
       3, 0,             4, 0,         5, 0,         6, 0,
```

TABLE IV-continued

Modification of DEFLATE

```
       7, 0,             8, 0,         9, 0,         10, 0,
      11, 1,            13, 1,        15, 1,         17, 1,
      19, 2,            23, 2,        27, 2,         31, 2,
      35, 3,            43, 3,        51, 3,         59, 3,
      67, 4,            83, 4,        99, 4,        115, 4,
     131, 5,           163, 5,       195, 5,        227, 5,
     258, 0,
   };
// First value is the base distance, the second is the extra bits
// that need to be read from the stream
// Once read, those bits will be added to the base distance
// Min value: 1, Max value: 32768
      const unsigned short Inflate::m_Distance[(Distances-2)* 2 ] =
   {
      0x0001,  0,       0x0002,  0,
      0x0003,  0,       0x0004,  0,
      0x0005,  1,       0x0007,  1,
      0x0009,  2,       0x000d,  2,
      0x0011,  3,       0x0019,  3,
      0x0021,  4,       0x0031,  4,
      0x0041,  5,       0x0061,  5,
      0x0081,  6,       0x00c1,  6,
      0x0101,  7,       0x0181,  7,
      0x0201,  8,       0x0301,  8,
      0x0401,  9,       0x0601,  9,
      0x0801, 10,       0x0c01, 10,
      0x1001, 11,       0x1801, 11,
      0x2001, 12,       0x3001, 12,
      0x4001, 13,       0x6001, 13,
   };
// Here is a mixed version of the two array above. This is done
// mainly in order to spare a register in the assembly decompressor
      const unsigned short   Inflate::m_DistanceAndBytesToCopy[ (
Distances - 2 ) * 4 ] =
   {
      0x0001,  0,       // Distance code 0
           0,  0,       // Bytes to copy code 0
                        //   (escape code, not used)
      0x0002,  0,       // Distance code 1
           3,  0,       // Bytes to copy code 1
      0x0003,  0,       // Distance code 2
           4,  0,       // Bytes to copy code 2
      0x0004,  0,       // Distance code 3
           5,  0,       // Bytes to copy code 3
      0x0005,  1,       // Distance code 4
           6,  0,       // Bytes to copy code 4
      0x0007,  1,       // Distance code 5
           7,  0,       // Bytes to copy code 5
      0x0009,  2,       // Distance code 6
           8,  0,       // Bytes to copy code 6
      0x000d,  2,       // Distance code 7
           9,  0,       // Bytes to copy code 7
      0x0011,  3,       // Distance code 8
          10,  0,       // Bytes to copy code 8
      0x0019,  3,       // Distance code 9
          11,  1,       // Bytes to copy code 9
      0x0021,  4,       // Distance code 10
          13,  1,       // Bytes to copy code 10
      0x0031,  4,       // Distance code 11
          15,  1,       // Bytes to copy code 11
      0x0041,  5,       // Distance code 12
          17,  1,       // Bytes to copy code 12
      0x0061,  5,       // Distance code 13
          19,  2,       // Bytes to copy code 13
      0x0081,  6,       // Distance code 14
          23,  2,       // Bytes to copy code 14
      0x00c1,  6,       // Distance code 15
          27,  2,       // Bytes to copy code 15
      0x0101,  7,       // Distance code 16
          31,  2,       // Bytes to copy code 16
      0x0181,  7,       // Distance code 17
          35,  3,       // Bytes to copy code 17
      0x0201,  8,       // Distance code 18
          43,  3,       // Bytes to copy code 18
      0x0301,  8,       // Distance code 19
          51,  3,       // Bytes to copy code 19
```

TABLE IV-continued

Modification of DEFLATE

```
        0x0401,  9,    // Distance code 20
            59, 3,     // Bytes to copy code 20
        0x0601,  9,    // Distance code 21
            67, 4,     // Bytes to copy code 21
        0x0801, 10,    // Distance code 22
            83, 4,     // Bytes to copy code 22
        0x0c01, 10,    // Distance code 23
            99, 4,     // Bytes to copy code 23
        0x1001, 11,    // Distance code 24
           115, 4,     // Bytes to copy code 24
        0x1801, 11,    // Distance code 25
           131, 5,     // Bytes to copy code 25
        0x2001, 12,    // Distance code 26
           163, 5,     // Bytes to copy code 26
        0x3001, 12,    // Distance code 27
           195, 5,     // Bytes to copy code 27
        0x4001, 13,    // Distance code 28
           227, 5,     // Bytes to copy code 28
        0x6001, 13,    // Distance code 29
           258, 0,     // Bytes to copy code 29
};
```

Assume that the coded data is processed using an accumulator, of a size 2S bits, with S bits of coded data each read. On modern processors, the accumulator can be a register, which can have a size from 32 to 128 bits. On processors which have chained registers—shifting pushes data from one register to another—S can be set to the maximum size of a register. Otherwise, S should be half the register's size. The present invention uses the method of the following pseudo-code to decompress data streams.

Let R the register size.
Initialize accumulator
Every time $N_b$ bits are needed do:
Fetch $N_b$ bits
Read $N_b$ bits
Drop $N_b$ bits
Initializing the accumulator:
Set Acc (accumulator) to 0.
Set $Acc_{bits}$ (accumulator available bits) to 0.
Fetching $N_b$ bits:
If $N_b > Acc_{bits}$
Read S bits from the source stream.
Store bits such as Acc |= S << (R/2–$Acc_{bits}$)
Add R/2 to $Acc_{bits}$
EndIf
Reading $N_b$ from the accumulator:
Return (Acc >> (R–$N_b$)),
Dropping $N_b$ read bits:
Subtract $N_b$ from $Acc_{bits}$
Set Acc = Acc << $N_b$ More specifically, assuming that $Code_{MAX}$ is the largest overall symbol code size, $T_N$ is the table node having a value of $T_N$ value and a length of $T_N$ length, the following pseudo-code represents a method for decoding using a table generated using the code of Tables I, II, and III.

Fetch $Code_{MAX}$ bits from the input stream
Retrieve the table node $T_N$ at position: (Acc >> (R–$T_1$))
If $T_N$ length > $Code_{MAX}$ then do:
Find a new table node $T_N$ at position: $T_N$+($T_N$ value – ((Acc << $T_1$) >> $T_N$ length)
Drop $T_N$ length bits
Return $T_N$ value The length and distance codes information are provided in the single table 1000. On a typical 16-registers RISC processor, the reduced simplicity of the decoding allows implementing a full block decompressing loop without any stack accessing or extra memory reading, apart from required reading of tables.

Progressive Decoding and Processing Time Distribution

Alternative embodiments allow for the user to better control processor usage over time for conditions where partial decoding of the data is required. This might be required, for example, if the decompressed file is 200 kbytes, but only 1 Kbyte is needed at a time. At some point during decompression the uncompressed 1 Kbyte block of data might be part of one or several Dynamic Huffman Blocks, requiring the rebuilding of previously built tables. By placing all of the Huffman headers, that is for all blocks in the file, at the beginning of the stream, the decompression can be better controlled.

In the alternative embodiments, all of the Huffman trees are grouped at the beginning of the data stream, followed by the encoded data. For comparison, FIG. 11 shows the prior art structure of a block of a dynamic Huffman code 1100 as a first portion 1101 having encoded block symbols, a second portion 1103 having literal and distance code lengths, and a third portion 1105 having distance and tree code lengths. In the prior art method of decoding, as specified in the DEFLATE specification, each dynamic or static Huffman block has a header prior to the encoded data, that is used to create the Huffman decode tree. In the alternative embodiments, the encoded block symbols, first portion 1101 and literal and distance code lengths, second portion 1103, are grouped together in one portion.

A first alternative embodiment for reducing the overhead associated with building tables includes building up Huffman tables as needed, where the tables are pre-decoded prior to decoding the data.

A second alternative embodiment for reducing table building overhead includes pre-processing and building as many Huffman tables as memory permits prior to decoding any output data by caching progressively decodes the Huffman data a few blocks in advance. Table caching permits the generation of only a few Huffman tables at a time without necessarily building all the tables needed to decode the whole stream. The amount of tables to be created is only fixed by the amount of memory available. As DEFLATE coded data can only be decoded sequentially—any current output byte might rely on a previously decoded byte—any decoded block can have its corresponding Huffman table discarded.

Caching can be implemented as a simple state machine along with a reservoir-type structure. Caching starts by decoding the maximum number of Huffman tables that memory will allow. The state machine will then wait for the decoder to consume at least one table. Once done, the corresponding slot is released, the next unprocessed Huffman table is created at the newly freed position. The advantage of caching is that it provides more flexibility in case of progressive decoding. The user is less constrained by important processing peaks and can more easily distribute the processing over the allocated time slices.

One embodiment of each of the methods described herein is in the form of a computer program that executes on a processing system, e.g., a one or more processors and memories that are part of an embedded system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, a game machine cartridge, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system. In addition, the use of a Huffman code herein is as an exemplary entropy coding scheme, and the present invention can be modified to perform with other entropy codes or with other prefix codes.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

It should further be appreciated that although every aspect of the coding has not be discussed in detail, the invention is not limited to a specific coding method. Furthermore, the invention is not limited to any one type of network architecture and method of encapsulation, and thus may be utilized in conjunction with one or a combination of other network architectures/protocols.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A computer-readable medium encoded with computer-executable instructions that when executed by a processor cause the processor to implement a method of generating one or more look-up tables to decompress binary strings of prefix codes into values, said method comprising:

determining a plurality of binary codes, $C_i$, the length of each of said plurality of codes, $L_i$, in bits, and a code value, $V_i$, corresponding to each of said plurality of codes;

setting a primary table of size T1 bits having $2^{T1}$ binary entries;

for each code of said plurality of codes having length less than or equal to T1 bits, constructing primary table entries to look up each code in the T1 most significant entry bits and return the corresponding code value; and, if any of said plurality codes has a length greater than T1 bits then the code prefix of said code is the T1 most significant bits, and said method further comprises:

constructing primary table entries to look up said code prefix and return an offset to one of one or more secondary tables in the computer readable code corresponding to the code prefix; and constructing one or more secondary tables, each having a corresponding size, in bits and 2 to the power of the size binary entries, to look up the portion of each code of length greater than T1 bits not including said code prefix and return the corresponding code value.

2. The computer-readable medium of claim 1, wherein T1 is predetermined.

3. The computer-readable medium of claim 1, wherein T1 is calculated after said determining of said code.

4. The computer-readable medium claim 1, wherein each primary table entry has a corresponding first value and second value, and where, for each code of said plurality of codes having length less than or equal to T1 bits, said constructing further includes, assigning the corresponding code value to said first value and the corresponding length to said second value.

5. The computer-readable medium of claim 1, wherein each primary table entries range in value from binary 0 to binary $2^{T1}$.

6. The computer-readable medium of claim 1, wherein the size of each of said one or more secondary tables is equal to the maximum length of all codes having the code prefix corresponding to said secondary table, minus T1.

7. The computer-readable medium of claim 6, wherein each primary table entry has a corresponding first value and second value, and where, for each primary table entry corresponding to a code prefix, said constructing primary table entries further includes assigning said offset to said secondary table corresponding to the code prefix to said first value and the size of said secondary table corresponding to the code prefix to said second value.

8. The computer-readable medium of claim 7, wherein said entry of each of said one or more secondary tables has a corresponding first value and second value, and where said constructing one or more secondary tables includes assigning the corresponding code value to said first value and the corresponding length to said second value.

9. The computer-readable medium of claim 6, wherein each secondary table entries range in value from binary 0 to binary 2 to the power of the secondary table size.

10. The computer-readable medium of claim 1, wherein the values were compressed using a Huffman code.

11. The computer-readable medium of claim 1, wherein the carrier medium is a game cartridge and wherein said processor implements said method on a game machine.

12. A carrier computer-readable medium encoded with computer-executable instructions that when executed by a processor cause the processor to implement a method of decompressing binary strings of prefix codes into values using one or more look-up tables, said method comprising:
    reading a binary code into an accumulator;
    looking up the T1 most significant bits of the accumulator in a primary table to return a first value and a second value;
    determining if a secondary table look-up is required;
    if a secondary table look-up is not required, then
        returning the code value as the returned first value, and noting that the code length is the returned second value;
    if a secondary table look-up is required, then
        determining a secondary table position in the computer readable code segment from the returned first value, and
        looking up the number of bits corresponding to the returned second value from the accumulator in the secondary table to return a code value and a code size; and
    shifting the most significant bits of the code length from the accumulator.

13. The computer-readable medium of claim 12, wherein said primary table has a size T1 bits and has $2^{T1}$ binary entries.

14. The computer-readable medium of claim 12, wherein said determining determines if the first value is a secondary table offset or a code value.

15. The computer-readable medium of claim 12, wherein said primary table is said primary table of claim 1.

16. The computer-readable medium of claim 12, wherein said secondary table is said secondary table of claim 1.

17. The computer-readable medium of claim 12, wherein the values were compressed using a Huffman code.

18. The computer-readable medium of claim 12, wherein the carrier medium is a game cartridge and wherein said processor implements said method on a game machine.

19. A method of generating one or more look-up tables to decompress binary strings of prefix codes into values, said method comprising:
    determining a plurality of binary codes, Ci, the length of each of said plurality of codes, Li, in bits, and a code value, Vi, corresponding to each of said plurality of codes;
    setting a primary table of size T1 bits having $2^{T1}$ binary entries;
    for each code of said plurality of codes having length less than or equal to T1 bits, constructing primary table entries to look up each code in the T1 most significant entry bits and return the corresponding code value; and,
    if any of said plurality codes has a length greater than T1 bits then the code prefix of said code is the T1 most significant bits, and said method further comprises:
        constructing primary table entries to look up said code prefix and return an offset to one of one or more secondary tables corresponding to the code prefix; and
        constructing one or more secondary tables, each having a corresponding size, in bits and 2 to the power of the size binary entries, to look up the portion of each code of length greater than T1 bits not including said code prefix and return the corresponding code value.

20. The method of claim 19, wherein T1 is predetermined.

21. The method of claim 19, wherein T1 is calculated after said determining of said code.

22. The method of claim 19, wherein each primary table entry has a corresponding first value and second value, and where, for each code of said plurality of codes having length less than or equal to T1 bits, said constructing further includes, assigning the corresponding code value to said first value and the corresponding length to said second value.

23. The method of claim 19, wherein each primary table entries range in value from binary 0 to binary $2^{T1}$.

24. The method of claim 19, wherein the size of each of said one or more secondary tables is equal to the maximum length of all codes having the code prefix corresponding to said secondary table, minus T1.

25. The method of claim 24, wherein each primary table entry has a corresponding first value and second value, and where, for each primary table entry corresponding to a code prefix, said constructing primary table entries further includes assigning said offset to said secondary table corresponding to the code prefix to said first value and the size of said secondary table corresponding to the code prefix to said second value.

26. The method of claim 25, wherein said entry of each of said one or more secondary tables has a corresponding first value and second value, and where said constructing one or more secondary tables includes assigning the corresponding code value to said first value and the corresponding length to said second value.

27. The method of claim 24, wherein each secondary table entries range in value from binary 0 to binary 2 to the power of the secondary table size.

28. The method of claim 19, wherein the values were compressed using a Huffman code.

29. A method of decompressing binary strings of prefix codes into values using one or more look-up tables, said method comprising:
    reading a binary code into an accumulator;
    looking up the T1 most significant bits of the accumulator in a primary table to return a first value and a second value;
    determining if a secondary table look-up is required;

if a secondary table look-up is not required, then
    returning the code value as the returned first value, and
    noting that the code length is the returned second value;
if a secondary table look-up is required, then
    determining a secondary table position in the computer readable code segment from the returned first value, and
    looking up the number of bits corresponding to the returned second value from the accumulator in the secondary table to return a code value and a code size; and
shifting the most significant bits of the code length from the accumulator.

30. The method of claim 29, wherein said primary table has a size T1 bits and has $2^{T1}$ binary entries.

31. The method of claim 29, wherein said determining determines if the first value is a secondary table offset or a code value.

32. The method of claim 29, wherein said primary table is said primary table of claim 19.

33. The method of claim 29, wherein said secondary table is said secondary table of claim 19.

34. The method of claim 29, wherein the values where compressed using a Huffman code.

* * * * *

UNITED STATES PATENT AND TRADEMARK OFFICE
CERTIFICATE OF CORRECTION

PATENT NO.         : 7,353,233 B1
APPLICATION NO.    : 11/103668
DATED              : April 1, 2008
INVENTOR(S)        : Ganea Page 1 of 1

It is certified that error appears in the above-identified patent and that said Letters Patent is hereby corrected as shown below:

Title Page items 12 and 75

Kindly change the inventor name from "Alexandre Ganca" to --Alexandre Ganea--.

Signed and Sealed this

Twenty-sixth Day of August, 2008

JON W. DUDAS
*Director of the United States Patent and Trademark Office*